(12) United States Patent
Ehara et al.

(10) Patent No.: US 9,357,393 B2
(45) Date of Patent: May 31, 2016

(54) INFORMATION PROCESSING APPARATUS, COMMUNICATION SYSTEM, AND INFORMATION PROCESSING METHOD

(71) Applicant: Sony Corporation, Tokyo (JP)

(72) Inventors: Tadashi Ehara, Kanagawa (JP); Masanori Sato, Tokyo (JP); Katsutoshi Itoh, Tokyo (JP); Shinji Takae, Tokyo (JP); Tomoaki Matsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/384,750

(22) PCT Filed: Dec. 12, 2012

(86) PCT No.: PCT/JP2012/082171
§ 371 (c)(1),
(2) Date: Sep. 12, 2014

(87) PCT Pub. No.: WO2013/140680
PCT Pub. Date: Sep. 26, 2013

(65) Prior Publication Data
US 2015/0087267 A1    Mar. 26, 2015

(30) Foreign Application Priority Data

Mar. 23, 2012  (JP) .................... 2012-067364

(51) Int. Cl.
| | | |
|---|---|---|
| H04M 1/66 | (2006.01) |
| H04W 12/08 | (2009.01) |
| H04M 3/42 | (2006.01) |
| H04W 8/18 | (2009.01) |
| H04W 12/06 | (2009.01) |

(52) U.S. Cl.
CPC ............... *H04W 12/08* (2013.01); *H04M 3/42* (2013.01); *H04W 8/183* (2013.01); *H04W 12/06* (2013.01)

(58) Field of Classification Search
None
See application file for complete search history.

(56) References Cited

FOREIGN PATENT DOCUMENTS

| | | |
|---|---|---|
| JP | 08-195979 A | 7/1996 |
| JP | 2002-157525 A | 5/2002 |
| JP | 2005-100364 A | 4/2005 |
| JP | 2006-074103 A | 3/2006 |
| JP | 2008-109527 A | 5/2008 |

OTHER PUBLICATIONS

No Author Listed, Feasibility study on the security aspects of remote provisioning and change of subscription for machine to machine (M2M) equipment. 3rd Generation Partnership Project; Technical Specification Group Services and System Aspects Technical Report. Jun. 2010;9.2.0:1-87.

*Primary Examiner* — Adolf Dsouza
(74) *Attorney, Agent, or Firm* — Chip Law Group; Pramod Chintalapoodi

(57) ABSTRACT

A proper communication service is provided according to use by a user. An information processing apparatus is an information processing apparatus that includes a control unit and a provision unit. At this point, the control unit performs control for lending to a wireless communication apparatus a connection right that is used in providing a specific service, the connection right being for connecting to a predetermined network using wireless communication. Furthermore, the provision unit provides the wireless communication apparatus that is connected using the lent connection right, with the specific service using the wireless communication.

12 Claims, 27 Drawing Sheets a b

FIG. 1
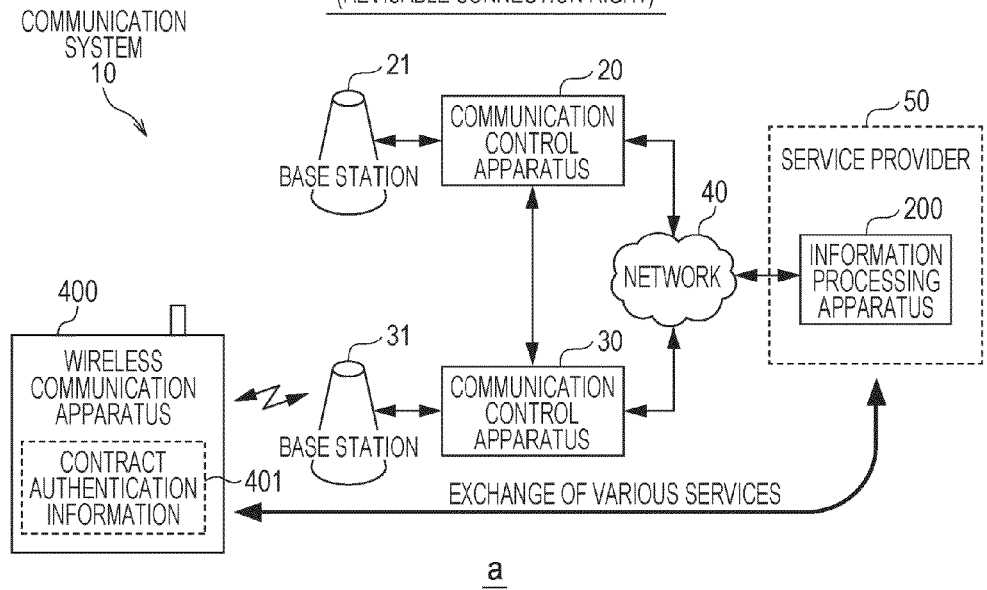
a
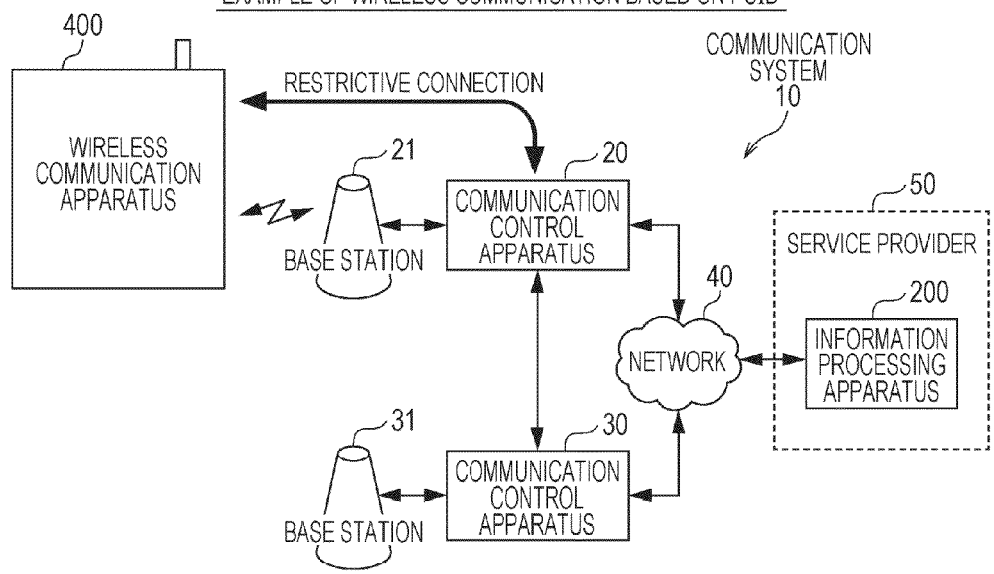
b

FIG. 4

SERVICE MANAGEMENT
DATABASE
240

| | USER ID | PASSWORD | TERMINAL IDENTIFICATION INFORMATION | TYPE OF TERMINAL |
|---|---|---|---|---|
| 1 | 1452 | 2233 | AAAA | ELECTRONIC BOOK A |
| 2 | 5432 | 5768 | BBBB | PORTABLE B |
| 3 | 5678 | 8907 | CCCC | SMART C |
| ⋮ | ⋮ | ⋮ | ⋮ | ⋮ |

CONTRACT AUTHENTICATION
INFORMATION MANAGEMENT
DATABASE
250

| CONTRACT AUTHENTICATION INFORMATION MANAGEMENT NO 251 | USAGE STATE 252 | LOAN DESTINATION 253 | LOAN TIME 254 |
|---|---|---|---|
| 1 | IN USE | AAAA | 00:23:56 |
| 2 | IN USE | BBBB | 00:09:57 |
| 3 | — | — | — |
| 4 | — | — | — |
| ⋮ | ⋮ | ⋮ | ⋮ | a

CONTRACT AUTHENTICATION
INFORMATION MANAGEMENT
DATABASE
250

| CONTRACT AUTHENTICATION INFORMATION MANAGEMENT NO 251 | USAGE STATE 252 | LOAN DESTINATION 253 | LOAN TIME 254 |
|---|---|---|---|
| 1 | IN USE | AAAA | 00:23:56 |
| 2 | IN USE | BBBB | 00:09:57 |
| 3 | IN USE | CCCC | 00:01:23 |
| 4 | — | — | — |
| ⋮ | ⋮ | ⋮ | ⋮ | b

FIG. 7

DEVICE MANAGEMENT
DATABASE
330

| | SERVICE IDENTIFICATION INFORMATION 331 | TERMINAL IDENTIFICATION INFORMATION 332 | CONTRACT AUTHENTICATION INFORMATION LOAN INFORMATION 333 | LOAN TIME 334 |
|---|---|---|---|---|
| 1 | G001 | AAAA | 1 | 00:23:56 |
| 2 | G001 | BBBB | 2 | 00:09:57 |
| 3 | — | — | — | — |
| ⋮ | ⋮ | ⋮ | ⋮ | ⋮ | a

DEVICE MANAGEMENT
DATABASE
330

| | SERVICE IDENTIFICATION INFORMATION 331 | TERMINAL IDENTIFICATION INFORMATION 332 | CONTRACT AUTHENTICATION INFORMATION LOAN INFORMATION 333 | LOAN TIME 334 |
|---|---|---|---|---|
| 1 | G001 | AAAA | 1 | 00:23:56 |
| 2 | G001 | BBBB | 2 | 00:09:57 |
| 3 | G001 | CCCC | 3 | 00:01:23 |
| ⋮ | ⋮ | ⋮ | ⋮ | ⋮ | b

FIG. 8
CONTRACT AUTHENTICATION
INFORMATION MANAGEMENT
DATABASE
340
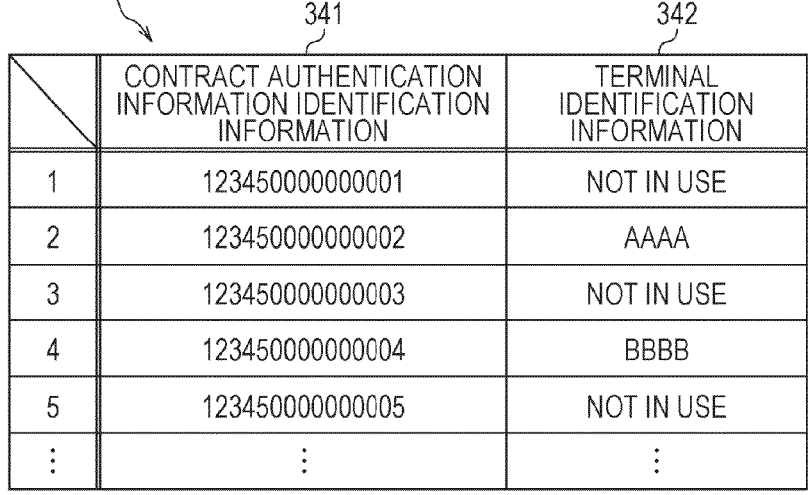
a
CONTRACT AUTHENTICATION
INFORMATION MANAGEMENT
DATABASE
340
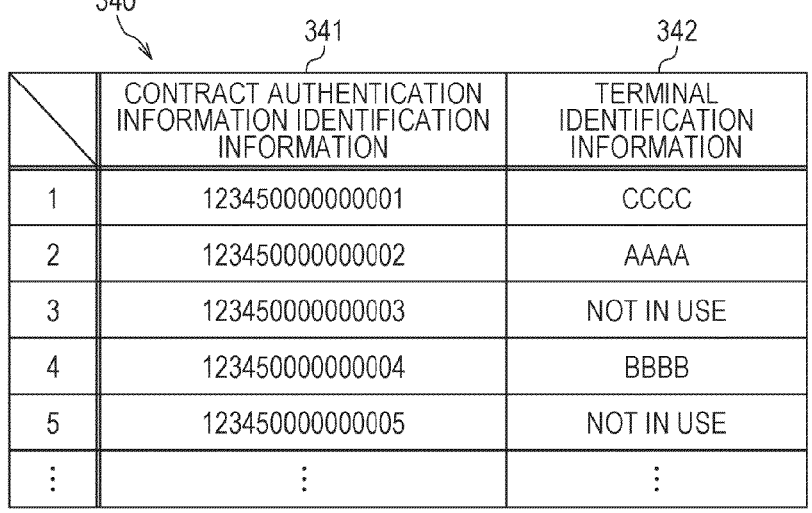
b FIG. 11
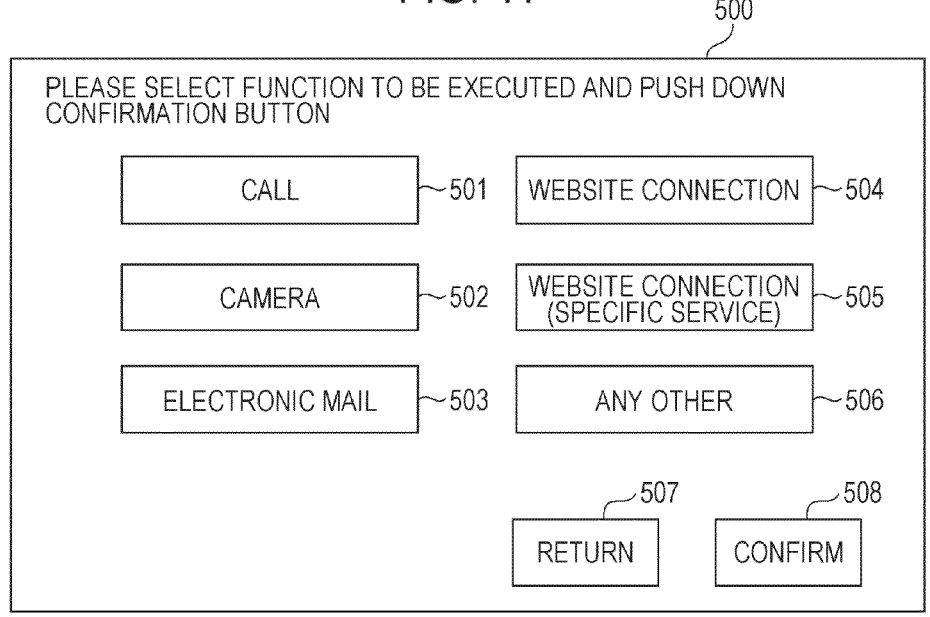
a
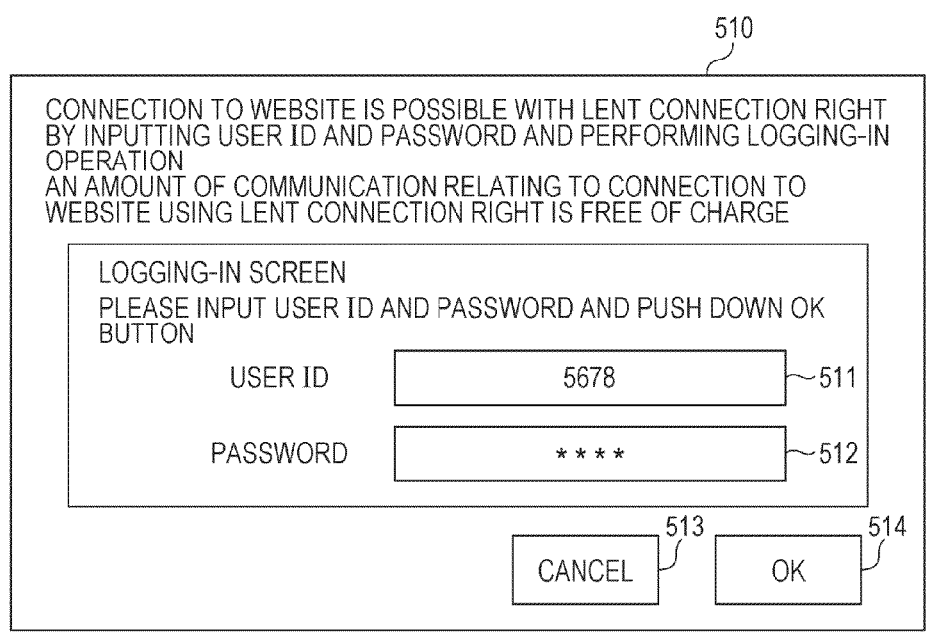
b FIG. 12
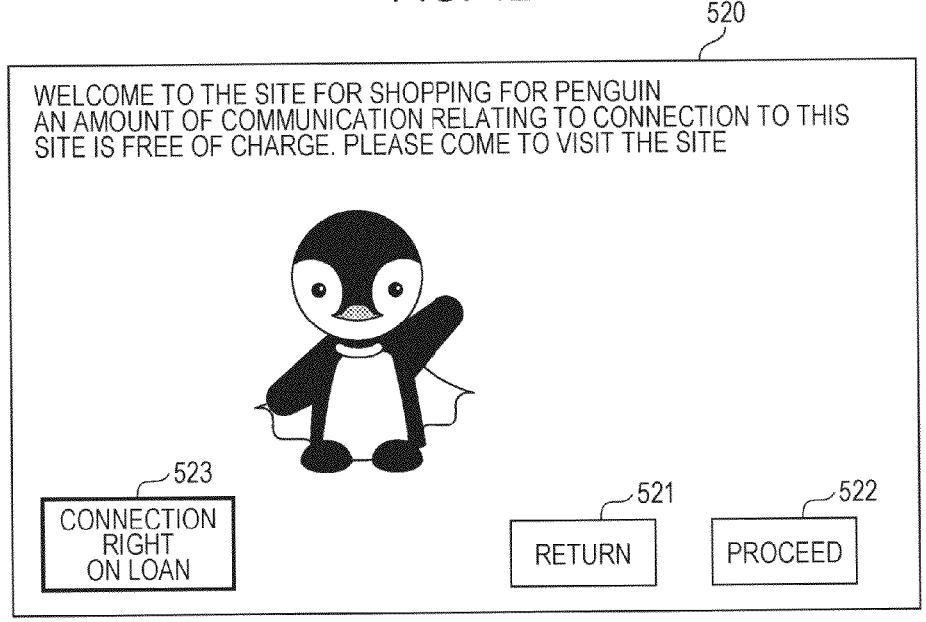
a
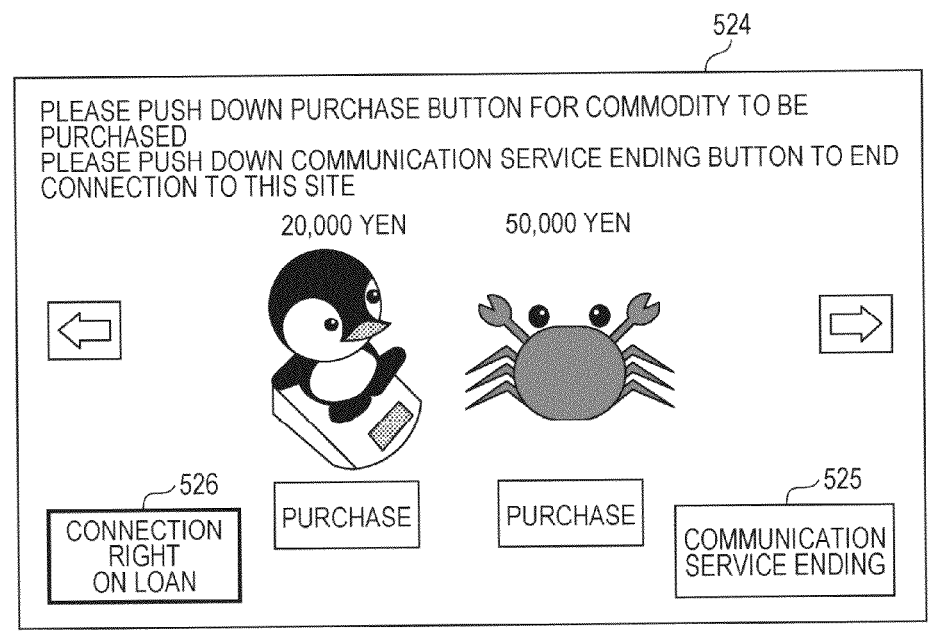
b FIG. 20
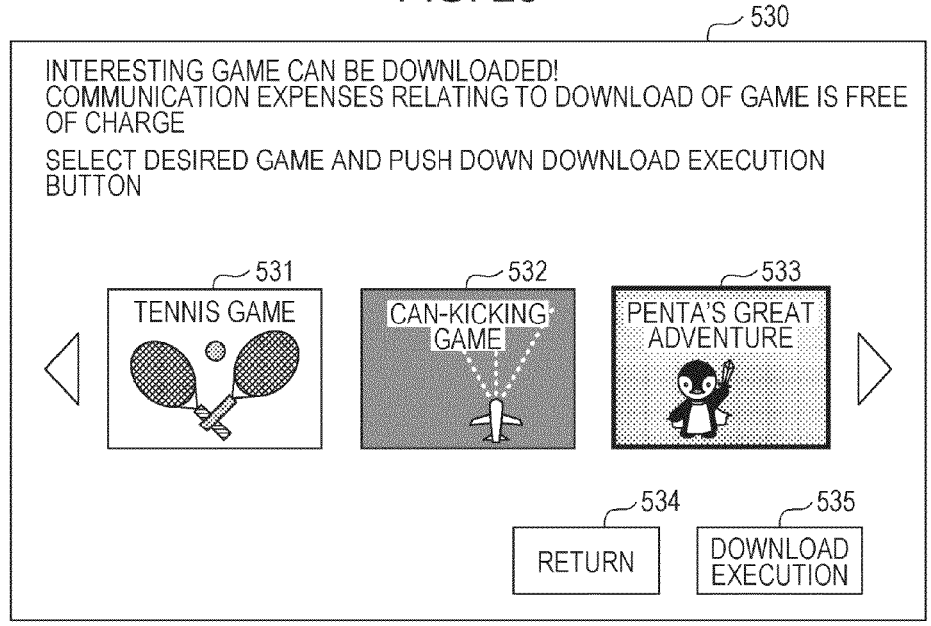
a
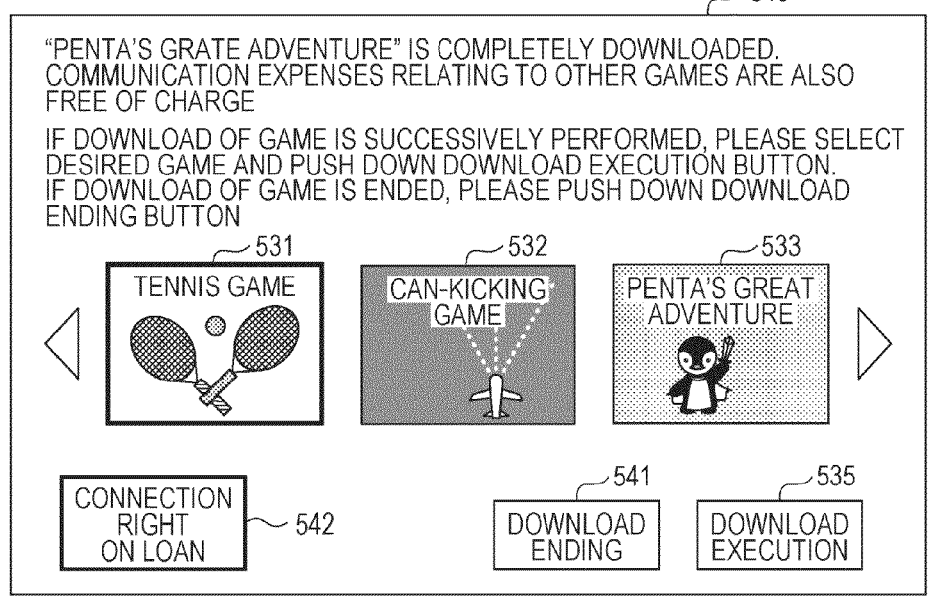
b

INFORMATION PROCESSING APPARATUS, COMMUNICATION SYSTEM, AND INFORMATION PROCESSING METHOD

TECHNICAL FIELD

The present technology relates to an information processing apparatus and particularly to an information processing apparatus that connects to a network, a communication system, and an information processing method.

BACKGROUND ART

Functional extension is currently under discussion in the 3rd Generation Partnership Project (3GPP) (for example, refer to NPL 1) that formulates technical specifications for public wireless communication networks.

A method with flexibly using information indicating availability of a service is possible with the functional extension (called Machine-to-Machine equipment). The information indicating the availability of the service is contract authentication information (for example, a revisable connection right). For example, the contract authentication information can be downloaded, the downloading can be temporarily stopped, or the downloading can be resumed, over a network.

Furthermore, currently, the contract authentication information needs to be retained in a physical device called a Subscriber Identity Module (SIM) card. However, a retention method is also made flexible by dealing with the contract authentication information in software.

CITATION LIST

Non Patent Literature

NPL 1: 3GPP TR 33.812 V9.2.0 (2010-06)

SUMMARY OF INVENTION

Technical Problem

A method of using the contract authentication information different than that in the related art is considered by using the functional extension described above.

For example, user's own wireless communication apparatus's easy receiving of a desired communication service from a service provider that provides various communication services provides a user with convenience. Furthermore, the service provider also can have an opportunity to provide various communication services.

An object of the present technology that is invented in view of such a situation is to provide a proper communication service according to use by a user.

Solution to Problem

According to a first aspect of the present technology whose purpose is to solve the problems described above, there are provided an information processing apparatus, an information processing method for use in the information processing apparatus, and a program for causing a computer to execute the information processing method, the information processing apparatus including: a control unit that performs control for lending to a wireless communication apparatus a connection right that is used in providing a specific service, the connection right being for connecting to a predetermined network using wireless communication; and a provision unit that, using the wireless communication, provides the specific service to the wireless communication apparatus that is connected using the lent connection right. Accordingly, an operation is caused to occur in which the connection right is lent to the wireless communication apparatus and a specific service is provided to the wireless communication apparatus that is connected using the lent connection right.

Furthermore, in the first aspect, the control unit may validate the connection right that is lent to the wireless communication apparatus at the timing of starting to provide the specific service and may perform control for invalidating the connection right at the timing of ending providing the specific service. Accordingly, an operation is caused to occur in which the connection right is validated at the timing of starting to provide the specific service and the connection right is invalidated at the timing of ending providing the specific service.

Furthermore, in the first aspect, the control unit may lend to the wireless communication apparatus the connection right to which a limit on a time of use is imposed, and if a predetermined time relating to the limit on the time of use elapses from when the connection right is lent, the control unit may perform control for invalidating the connection right. Accordingly, an operation is caused to occur in which the connection right to which the limit on the time of use is imposed is lent to the wireless communication apparatus and the connection right is invalidated if the predetermined time relating to the limit on the time of use elapses from when the connection right is lent.

Furthermore, in the first aspect, the control unit may perform control for lending the wireless communication apparatus the connection right that is used only in providing the specific service. Accordingly, an operation is caused to occur in which the connection right that is used only in providing the specific service is lent to the wireless communication apparatus.

Furthermore, in the first aspect, if a request to provide the specific service is received, the control unit may perform control for lending the connection right to the wireless communication apparatus that transmits the provision request. Accordingly, an operation is caused to occur in which if the request to provide the specific service is received, the connection right is lent to the wireless communication apparatus that transmits the provision request.

Furthermore, in the first aspect, a first management unit that manages the wireless communication apparatus that is able to be provided with the specific service may further be included, and the control unit may determine whether or not the wireless communication apparatus that transmits the provision request is able to be provided with the specific service, based on contents of management in the first management unit, and may perform control for lending the connection right only to the wireless communication apparatus that is determined as being able to be provided with the specific service. Accordingly, an operation is caused to occur in which it is determined whether or not the wireless communication apparatus that transmits the provision request is able to be provided with the specific service, based on the contents of the management in the first management unit, and the control for lending the connection right only to the wireless communication apparatus that is determined as being able to be provided with the specific service is performed.

Furthermore, in the first aspect, management information including at least one among identification information, a password, and model information for specifying the wireless communication apparatus that is able to be provided with the specific service may be stored in the first management unit, and the control unit may determine whether or not the wireless communication apparatus that transmits the provision request is able to be provided with the specific service, based on whether or not there is consistency between information included in the provision request and the management information. Accordingly, an operation is caused to occur in which based on whether or not there is consistency between the information, included in the provision request, and the management information, it is determined whether or not the wireless communication apparatus that transmits the provision request can be provided with the specific service.

Furthermore, in the first aspect, a second management unit that manages the connection right that is lent, at the time of providing the specific service, may further be included, and the control unit may determine whether or not the connection right is able to be lent to the wireless communication apparatus that transmits the provision request, based on contents of management in the second management unit, and may perform control for lending the connection right only to the wireless communication apparatus that is determined as an apparatus to which the connection right is able to be lent. Accordingly, an operation is caused to occur in which it is determined whether or not the connection right is able to be lent to the wireless communication apparatus that transmits the provision request, based on the contents of management in the second management unit, and the connection right is lent only to the wireless communication apparatus that is determined as the apparatus to which the connection right is able to be lent.

Furthermore, in the first aspect, an upper limit value of the wireless communication apparatus to which the connection right can be lent may be stored in the second management unit; and if the number of the wireless communication apparatuses to which the connection right is lent does not exceed the upper limit value at the time of receiving the provision request, the control unit may determine that the connection right is able to be lent to the wireless communication apparatus. Accordingly, an operation is caused to occur in which when the provision request is received, if the number of the wireless communication apparatuses to which the connection right is lent does not reach the upper limit value, it is determined that the connection right is able to be lent to the wireless communication apparatus.

Furthermore, according to a second aspect of the present technology, there is provided a communication system including: an information processing apparatus that includes a control unit which performs control for lending to a wireless communication apparatus a connection right that is used in providing a specific service, the connection right being for connecting to a predetermined network using wireless communication; and a wireless communication apparatus that is provided with the specific service using wireless communication by connecting to the information processing apparatus using the lent connection right. Accordingly, an operation is caused to occur in which the information processing apparatus lends the connection right to the wireless communication apparatus, and the wireless communication apparatus connects to the information processing apparatus using the lent connection right and is provided with the specific service.

Furthermore, in the second aspect, a first management apparatus that manages the wireless communication apparatus that is able to be provided with the specific service, may further be included, and the first management apparatus may determine whether or not each of the wireless communication apparatuses is able to be provided with the specific service, and the control unit may perform control for lending the connection right only to the wireless communication apparatus that is determined, by the first management apparatus, as being able to be provided with the specific service. Accordingly, an operation is caused to occur in which the first management apparatus determines whether or not each of the wireless communication apparatuses is able to be provided with the specific service, and the information processing apparatus lends the connection right only to the wireless communication apparatus that is determined, by the first management apparatus, as being able to be provided with the specific service.

Furthermore, in the second aspect, a second management apparatus that manages the connection right that is lent, at the time of providing the specific service, may further be included, and the second management apparatus may determine whether or not the connection right is able to be lent to each of the wireless communication apparatuses, and the control unit may perform control for lending the connection right only to the wireless communication apparatus that is determined, by the second management apparatus, as an apparatus to which the connection right is able to be lent. Accordingly, an operation is caused to occur in which the second management apparatus determines whether or not the connection right is able to be lent to each of the wireless communication apparatuses, and the information processing apparatus lends the connection right only to the wireless communication apparatus that is determined, by the second management apparatus, as an apparatus to which the connection right is able to be lent.

Advantageous Effects of Invention

According to the present technology, an excellent effect is accomplished in which a proper communication service can be provided according to use by the user.

BRIEF DESCRIPTION OF DRAWINGS

FIG. 1 is a block diagram illustrating a system configuration example of a communication system 10 according to a first embodiment of the present technology.

FIG. 4 is a diagram schematically illustrating a service management database 240 according to the first embodiment of the present technology.

FIG. 5 is a diagram schematically illustrating a contract authentication information management database 250 according to the first embodiment of the present technology.

FIG. 7 is a diagram schematically illustrating a device management database 330 according to the first embodiment of the present technology.

FIG. 8 is a diagram schematically illustrating a contract authentication information management database 340 according to the first embodiment of the present technology.

FIG. 11 is a diagram illustrating an example of a display screen that is displayed on a display unit 470 of the wireless communication apparatus 400 according to the first embodiment of the present technology.

FIG. 12 is a diagram illustrating an example of the display screen that is displayed on the display unit 470 of the wireless communication apparatus 400 according to the first embodiment of the present technology.

FIG. 20 is a diagram illustrating an example of a display screen that is displayed on a display unit 470 of the wireless communication apparatus 400 according to the second embodiment of the present technology.

DESCRIPTION OF EMBODIMENTS

Figure 2:
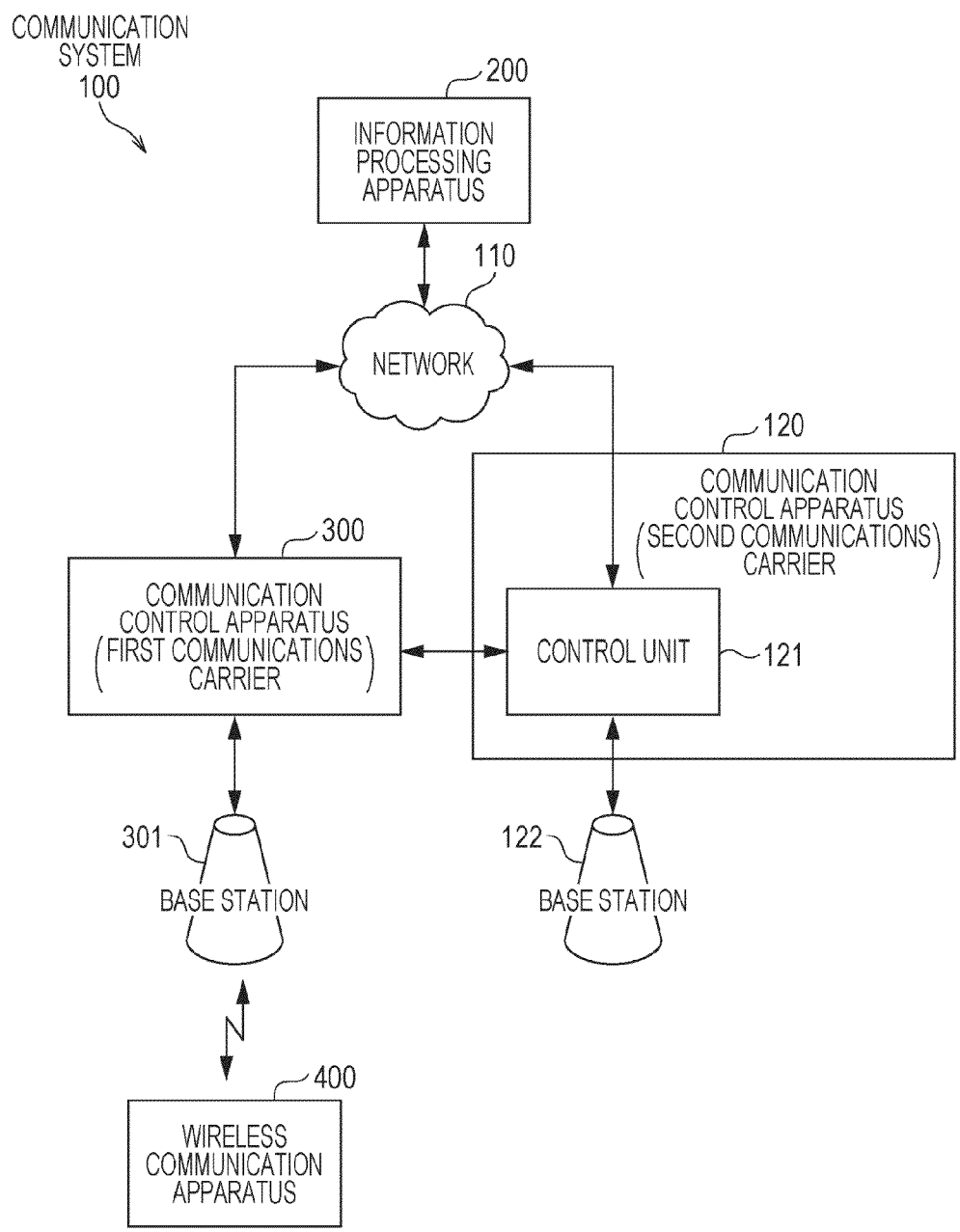
FIG. 2 is a block diagram illustrating a system configuration example of a communication system 100 according to the first embodiment of the present technology.

Embodiments of the present technology (hereinafter referred to as embodiments) are described below. Descriptions are provided in the following order.

1. First Embodiment (Communication Control: an Example of Browsing a Website Using a Lent Connection Right)

2. Second Embodiment (Communication Control: an Example of Downloading Game Content Using a Lent Connection Right)

3. Third Embodiment (Communication Control: an Example of a Communication System that Includes an Apparatus Which Manages a Lent Connection Right and an Apparatus Which Manages a Wireless Communication Apparatus that Receives a Specific Service)

1. First Embodiment

Configuration Example of Communication System

FIG. 1 is a block diagram illustrating a system configuration example of a communication system 10 according to a first embodiment of the present technology. FIG. 1 illustrates a configuration example of a communication system that is premised on a network configuration in which a network is assumed to be configured from a communication control apparatus 30 to which only a wireless communication apparatus that retains valid contract authentication information can be connected, and a communication control apparatus 20 to which even a wireless communication apparatus that does not retain valid contract authentication information can be connected.

FIG. 1a illustrates a wireless communication example in a case where a wireless communication apparatus 400 retains the valid contract authentication information 401. Furthermore, FIG. 1b illustrates a wireless communication example in a case where the wireless communication apparatus 400 does not retain the valid contract authentication information 401.

At this point, the contract authentication information is, for example, information that includes telephone subscriber information and authentication information, and is information for setting a revisable connection right. The contract authentication information, for example, is not limited to a specific communications carrier (for example, a mobile phone carrier) at the time of purchasing a device, and is contract authentication information (so-called soft SIM) with which the communications carrier is flexibly set after purchasing the device. Furthermore, the revisability of the contract authentication information over a network makes it easy to separate selling of a mobile phone and selecting of the communications carrier from each other and makes it possible to easily share the contract authentication information among multiple wireless communication apparatuses. Furthermore, a case where the contract authentication information is not retained, for example, means a case where the contract authentication information itself is not retained, or a case where only the contract authentication information invalidated by invalidation processing of the contract authentication information is retained. The contract authentication information, for example, supports a machine communication identify module (MCIM) (refer to NPL 1). Furthermore, the contract authentication information, for example is also referred to as a software downloadable subscriber identity module (SIM).

Furthermore, for example, if the valid contract authentication information is retained, this can be understood as a case where the connection right (the revisable connection right) to connect to a network 40 using wireless communication is retained. That is, based on the contract authentication information for connecting to a base station that is managed by the communications carrier, the connection right is a right to connect to such a base station.

The communication system 10 includes communication control apparatuses 20 and 30, base stations 21 and 31, a network 40, an information processing apparatus 200, and a wireless communication apparatus 400.

At this point, the communication control apparatus 20 and the communication control apparatus 30 play logical roles, and are assumed to be operated by different communications carriers, but may also be assumed to be operated by the same communications carrier. Furthermore, each of the communication control apparatus 20 and the communication control apparatus 30 is also assumed to be two or more in number. Furthermore, each of the communication control apparatus 20 and the communication control apparatus 30 may be configured as one apparatus that functions as an information processing apparatus, and may be configured from multiple apparatuses. At this point, the communication control apparatus 20 and the communication control apparatus 30 are meant to play relative roles if the wireless communication apparatus having the valid contract authentication information is assumed to serve as a reference. For this reason, one wireless communication apparatus is equivalent to the communication control apparatus 20, but there is also a likelihood that the other wireless communication apparatus will be equivalent to the communication control apparatus 30.

Moreover, the communication control apparatus 20, for example, is equivalent to a registration operator (RO), and the communication control apparatus 30, for example, is equivalent to a selected home operator (SHO) (for example, refer to NPL 1). That is, the communication system that is configured from the communication control apparatus 20 and the communication control apparatus 30, for example, is equivalent to the communication system that is presumed on the network configuration in which the network is configured from the SHO and the RO (for example, refer to NPL 1).

The wireless communication apparatus 400, for example, is a portable telephone apparatus (for example, a smart phone that has a call function and a data communication function. The wireless communication apparatus 400 is one example of the information processing apparatus in which the software downloadable SIM can be used. Furthermore, application to a different wireless communication apparatus in which the software downloadable SIM can be used is possible as well. For example, application to an imaging apparatus (for example, a digital camera and a digital video camera (for example, a camera-integrated recorder) that has a wireless communication function and to a sound output apparatus (for example, a portable music player) that has the wireless communication function) are possible. Furthermore, application to a display apparatus (for example, a digital photograph frame) that has the wireless communication function and to an electronic book display apparatus that has the wireless communication function are possible. Furthermore, for example, such an application as an information processing apparatus (for example, a personal computer that does not have the wireless communication function) that can perform the wireless communication by being equipped with a wireless communication device having the wireless communication function is possible as well.

As illustrated in FIG. 1a, if the wireless communication apparatus 400 retains the valid contract authentication information 401, based on the contract authentication information 401, the wireless communication apparatus 400 can connect to the communication control apparatus 30 through a base station 31. In contrast, as illustrated in FIG. 1b, if the wireless communication apparatus 400 does not retain the valid contract authentication information 401, the wireless communication apparatus 400 cannot connect to the communication control apparatus 30. However, in this case, based on a provisional connectivity identity (PCID), the wireless communication apparatus 400 can connect to the communication control apparatus 20 through a base station 21.

At this point, the PCID is an identifier for connecting to the communication control apparatus 20, and is assigned to all the wireless communication apparatuses (devices) each of which has a construction such as the software downloadable SIM.

The network 40 is a network such as a telephone network, or the Internet (for example, a public line network). Furthermore, the network 40 and the communication control apparatus 30 are connected to each other through a gateway (not illustrated). In the same manner, the network 40 and the communication control apparatus 20 are connected to each other though the gateway (not illustrated).

The communication control apparatus 20 is a communication control apparatus that is managed by a wireless communications carrier that provides a service such as an initial connection registration. The communication control apparatus 20, for example, corresponds to the wireless communications carrier (for example, the mobile phone carrier) that provides a wireless connection service. Furthermore, the communication control apparatus 20 includes a control unit (which is equivalent to a control unit 121 illustrated in FIG. 2).

The control unit of the communication control apparatus 20 performs authentication control of the wireless communication apparatus that is connected through the base station 21. For example, in the wireless communication apparatus that is connected through the base station 21, the control unit of the communication control apparatus 20 performs authentication, based on the PCID. Then, the communication control apparatus 20 provides the authenticated wireless communication apparatus with a service, such as the initial connection registration, in the authenticated wireless communication apparatus. Furthermore, the control unit of the communication control apparatus 20 is connected to the communication control apparatus 30, and exchanges various pieces of information between the communication control apparatus 20 and the communication control apparatus 30.

The base station 21 is a mobile communication base station (NodeB) that connects the wireless communication apparatus 400 and the communication control apparatus 20 through a wireless line.

The communication control apparatus 30 is a communication control apparatus that is managed by the wireless communication carrier that provides the wireless connection service. The communication control apparatus 30 provides an Internet-based service and the like and for example, corresponds to the wireless communications carrier (for example, the mobile phone carrier) that provides the wireless connection service. Furthermore, the communication control apparatus 30 includes a control unit (which is equivalent to a control unit 320 illustrated in FIG. 6).

The control unit of the communication control apparatus 30 performs authentication control of the wireless communication apparatus that is connected through the base station 31. For example, the control unit of the communication control apparatus 30 authenticates the wireless communication apparatus that retains the valid contract authentication information of the communication control apparatus 30, among the wireless communication apparatuses that are connected through the base station 31. Then, the communication control apparatus 30 connects the authenticated wireless communication apparatus to the network 40 through the gateway (not illustrated).

Furthermore, the control unit of the communication control apparatus 30 is connected to the communication control apparatus 20, and exchanges various pieces of information between the communication control apparatus 30 and the communication control apparatus 20. At this point, the wireless communication apparatus that does not retain the valid contract authentication information can connect (restrictively connect) to the communication control apparatus 20 through the communication control apparatus 30, based on the PCID of such a wireless communication apparatus.

The base station 31 is a mobile communication base station (NodeB) that connects the wireless communication apparatus 400 and the communication control apparatus 30 through the wireless line.

A service provider 50 is a service provider (SP) that provides various communication services, such as a mail order sale, an online game, a content retention service, and a content delivery service. Furthermore, the service provider 50 includes an information processing apparatus 200 for providing these communication services. Furthermore, the information processing apparatus 200 is connected to the communication control apparatus 20 and the communication control apparatus 30 through the network 40. At this point, an operator that provides various communication services is assumed to be the communications carrier that provides the wireless connection services, a mobile virtual network operator (MVNO) (a so-called business-running operator that is called a virtual communications carrier) or the like.

The information processing apparatus 200 is an information processing apparatus that provides the various communication services over the network 40, and provides the various communication services to the wireless communication apparatus 400 using the wireless communication. For example, the information processing apparatus 200 provides the communication services, such as a web service, a data download service, a data upload service, an online game, and the like.

For example, as illustrated in FIG. 1a, if the wireless communication apparatus 400 retains the valid contract authentication information 401, based on the valid contract authentication information 401, the wireless communication apparatus 400 is connected to the base station 31 through the wireless line and is connected to the communication control apparatus 30 through the base station 31. In this case, the wireless communication apparatus 400 is connected to the communication control apparatus 30 through the base station 31, and can be provided with the various services (for example, download of content) from the information processing apparatus 200. Furthermore, if the wireless communication apparatus 400 that retains the valid contract authentication information 401 connects to the communication control apparatus 20, the wireless communication apparatus 400 is connected to the communication control apparatus 20 through the communication control apparatus 30.

Furthermore, as illustrated in FIG. 1b, if the wireless communication apparatus 400 does not retain the valid contract authentication information 401, based on the PCID being retained, the wireless communication apparatus 400 can be connected (restrictively connected) to the communication control apparatus 20 though the base station 21. In this case, the wireless communication apparatus 400 is connected (restrictively connected) to the communication control apparatus 20 through the base station 21, but can perform only restrictive communication (for example, download of the contract authentication information, validation/invalidation of the contract authentication information).

Moreover, if the wireless communication apparatus 400 does not retain the valid contract authentication information 401, the wireless communication apparatus 400 can be connected to either of the base stations 21 and 31 according to a position in which the wireless communication apparatus 400 is used, and is connected to the communication control apparatus 20 through these base stations.

In this manner, the wireless communication apparatus 400 that does not retain the valid contract authentication information 401 cannot be provided with the various services from the information processing apparatus 200. That is, the wireless communication apparatus 400 (wireless communication apparatus 400 that does not retain the valid contract authentication information 401) that does not retain the revisable connection right can be understood as the device that is connected in a service-restricted manner. In contrast, the wireless communication apparatus (wireless communication apparatus 400 that retains the valid contract authentication information 401) that retains the revisable connection right can be understood as the device that is involved in a service connection (normal connection). Moreover, the wireless communication apparatus 400 that does not retain the revisable connection right obtains (for example, downloads the contract authentication information, or validates the contract authentication information) the valid contract authentication information 401 through the communication control apparatus 20, and thus can be connected to the communication control apparatus 30.

In this manner, if a user that owns the wireless communication apparatus 400 does not enter into a contract for the contract authentication information with the communications carrier that operates the communication control apparatus 30, the user cannot be provided with the various services from the information processing apparatus 200.

At this point, it is also assumed that even though the user enters into the contract for the contract authentication information with the communications carrier that operates the communication control apparatus 30 (even though the user owns the wireless communication apparatus 400), the user expects to reduce a burden of a communication cost which occurs when the various services are provided from the information processing apparatus 200. Furthermore, it is also assumed that even though the service provider 50 bears a communication cost relating to the various services, the service provider 50 expects to provide the user, who expects to be provided with the various services from the information processing apparatus 200, with the various services.

Accordingly, according to the first embodiment, the service provider 50 prepares multiple connection rights (multiple pieces of contract authentication information) in advance and lends the multiple connection rights, and thus the user is enabled to be properly provided with the various services from the information processing apparatus 200.

[Configuration Example of the Communication System]

FIG. 2 is a block diagram illustrating a system configuration example of a communication system 100 according to the first embodiment of the present technology.

The communication system 100 includes a network 110, base stations 122 and 301, a communication control apparatus (second communications carrier (second communications carrier) 120, a communication control apparatus (first communications carrier) 300, the information processing apparatus 200, and the wireless communication apparatus 400.

Moreover, the wireless communication apparatus 400 is assumed to retain the valid contract authentication information of the communication control apparatus (first communications carrier) 300. That is, the connection right to connect to the communication control apparatus (first communications carrier) 300 is set to be in the wireless communication apparatus 400.

At this point, the communication system 100 is a system that corresponds to the communication system 10 illustrated in FIG. 1. Specifically, the communication control apparatus (second communications carrier) 120 corresponds to the communication control apparatus 20 illustrated in FIG. 1, the communication control apparatus (first communications carrier) 300 corresponds to the communication control apparatus 30 illustrated in FIG. 1, and the information processing apparatus 200 corresponds to the information processing apparatus 200 illustrated in FIG. 1. For this reason, in this example, a part of the description of what is common to the communication system 100 and the communication system 10 illustrated in FIG. 1 is omitted.

The network 110 is a network such as the telephone network, or the Internet (for example, the public line network). Furthermore, the network 110 and the communication control apparatus (second communications carrier) 120 are connected to each other through the gateway (not illustrated). In the same manner, the network 110 and the communication control apparatus (first communications carrier) 300 are connected to each other though the gateway (not illustrated).

The communication control apparatus (second communications carrier) 120 is a communication control apparatus that is managed by the wireless communications carrier that provides the service such as the initial connection registration and the wireless connection service, and corresponds to the communication control apparatus 20 illustrated in FIG. 1. That is, the communication control apparatus (second communications carrier) 120 provides the Internet-based service and the like, and for example, corresponds to the wireless communications carrier (for example, the mobile phone carrier) that provides the wireless connection service. Furthermore, the communication control apparatus (second communications carrier) 120 includes the control unit 121.

The control unit 121 performs authentication control on the wireless communication apparatus that is connected through the base station 122. For example, the control unit 121 authenticates the wireless communication apparatus that retains the valid contract authentication information of the communication control apparatus (second communications carrier) 120, among the wireless communication apparatuses that are connected through the base station 122. Then, the communication control apparatus (second communications carrier) 120 connects the authenticated wireless communication apparatus to the network 110 through the gateway (not illustrated).

Furthermore, the control unit 121 performs the authentication based on the PCID on the wireless communication apparatus that is connected through the base station 122. Then, the control unit 121 provides the authenticated wireless communication apparatus with the services such as the initial connection registration. Furthermore, the control unit 121 is connected to the communication control apparatus (first communications carrier) 300, and exchanges various pieces of information between the communication control apparatus 120 and the communication control apparatus (first communications carrier) 300.

The base station 122 is a mobile communication base station (NodeB) that connects the wireless communication apparatus 400 and the communication control apparatus (second communications carrier) 120 through the wireless line.

The communication control apparatus (first communications carrier) 300 is a communication control apparatus that is managed by the wireless communications carrier that provides the services such as the initial connection registration and the wireless connection service, and corresponds to the communication control apparatus 30 illustrated in FIG. 1. That is, the communication control apparatus (first communications carrier) 300 provides the Internet-based service and the like, and for example, corresponds to the wireless communications carrier (for example, the mobile phone carrier) that provides the wireless connection service. Furthermore, the communication control apparatus (first communications carrier) 300 includes a control unit 320 (illustrated in FIG. 6).

The control unit 320 performs the authentication control on the wireless communication apparatus that is connected through a base station 301. For example, the control unit 320 authenticates the wireless communication apparatus that retains the valid contract authentication information of the communication control apparatus (first communications carrier) 300, among the wireless communication apparatuses that are connected through the base station 301. Then, the communication control apparatus (first communications carrier) 300 connects the authenticated wireless communication apparatus to the network 110 through the gateway (not illustrated).

Furthermore, the control unit 320 performs the authentication based on the PCID on the wireless communication apparatus that is connected through the base station 301. Then, the control unit 320 provides the authenticated wireless communication apparatus with the services such as the initial connection registration. Furthermore, the control unit 320 is connected to the communication control apparatus (second communications carrier) 120, and exchanges various pieces of information between the communication control apparatus 300 and the communication control apparatus (second communications carrier) 120.

At this point, an example in which the valid contract authentication information (revisable connection right) of the communication control apparatus (first communications carrier) 300 is set in the communication system 100 (example in which the connection right is set) is described. For example, the contract authentication information is set to be in each of the wireless communication apparatuses. Then, the control unit 320 (illustrated in FIG. 6) performs the validation/invalidation of the contract authentication information that is retained in each wireless communication apparatus, and thus can set the revisable connection right. Moreover, the validation/invalidation of the contract authentication information that is retained in each wireless communication apparatus can be performed based on the control at the communication control apparatus (second communications carrier) 120 side. For this reason, the control unit 121 may set the revisable connection right by validating/invalidating the contract authentication information that is retained in each wireless communication apparatus.

Furthermore, instead of retaining the contract authentication information in each wireless communication apparatus, the revisable connection right may be set by transmitting the contract authentication information itself. For example, setting information (including the contract authentication information) is transmitted from the communication control apparatus (first communications carrier) 300 to the wireless communication apparatus. The contract authentication information included in the setting information is retained in the wireless communication apparatus, and thus the valid contract authentication information is set to be in the wireless communication apparatus. Moreover, the transmission of the setting information (including the contract authentication information) to each wireless communication apparatus can be performed at the communication control apparatus (second communications carrier) 120 side. For this reason, the control unit 121 may set the revisable connection right by transmitting the setting information (including the contract authentication information) to each wireless communication apparatus.

The information processing apparatus 200 is an information processing apparatus (for example, a content server) that provides the various services over the network 110, and provides each wireless communication apparatus with the various communication services using the wireless communication. Moreover, the information processing apparatus 200 is described in detail referring to FIG. 3.

In this manner, the communication system 100 is a wireless communication system that has the wireless communication apparatus (device), the contract authentication information in which is revisable over the network.

[Configuration Example of the Information Processing Apparatus]

Figure 3:
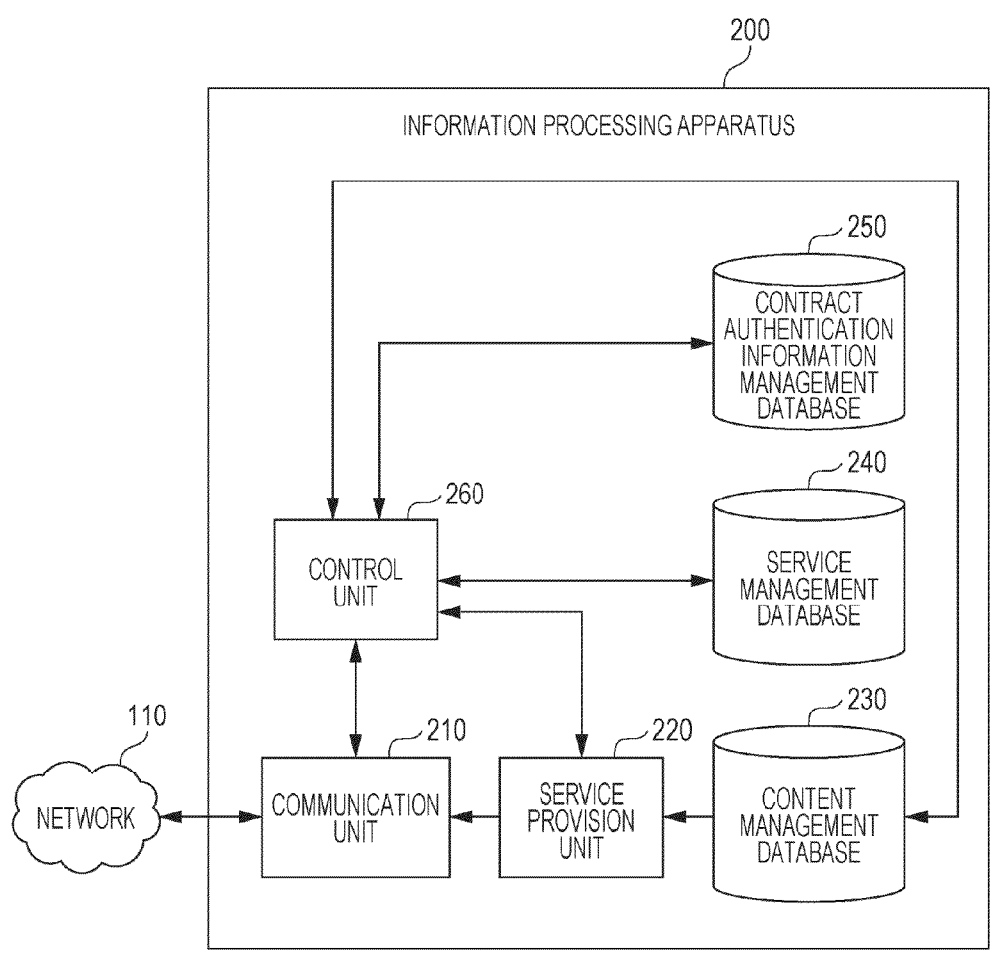
FIG. 3 is a block diagram illustrating a functional configuration example of an information processing apparatus 200 according to the first embodiment of the present technology.

FIG. 3 is a block diagram illustrating a functional configuration example of the information processing apparatus 200 according to the first embodiment of the present technology.

The information processing apparatus 200 includes a communication unit 210, a service provision unit 220, a content management database 230, a service management database 240, a contract authentication information management database 250, and a control unit 260.

The communication unit 210 is connected to the network 110, and performs the communication between each wireless communication apparatus that is connected through the network 110, under the control of the control unit 260. For example, the communication unit 210 receives, over the network 110, each information (for example, various types of notifications) that are transmitted from each wireless communication apparatus, and outputs each information being received to the control unit 260. Furthermore, the communication unit 210 transmits various items of content being output from the service provision unit 220, to each wireless communication apparatus over the network 110.

Under the control of the control unit 260, in response to a request from the wireless communication apparatus that is connected through the network 110, the service provision unit 220 provides the wireless communication apparatus with the various services. Furthermore, when providing the various communication services, the service provision unit 220 uses various pieces of data that are stored in the content management database 230. For example, if a request for the download of the content from the wireless communication apparatus 400 is received, the service provision unit 220 obtains content (for example, game content) relating to the request from the content management database 230. Then, the service provision unit 220 transmits the obtained content to the wireless communication apparatus 400 through the communication unit 210.

The content management database 230 is a database in which to store various pieces of data that are used when the service provision unit 220 provides the various communication services, or pieces of data that are transmitted from the wireless communication apparatus. For example, content (for example, image content) that is uploaded from the wireless communication apparatus, content for providing upload-target content (for example, game content or a website), or the like are stored in the content management database 230.

The service management database 240 is a database in which to store various pieces of data that are used when the information processing apparatus 200 provides the various communication services. Moreover, the service management database 240 is described in detail referring to FIG. 4.

The contract authentication information management database 250 is a database in which to store various pieces of information for managing the contract authentication information that is lent to each wireless communication apparatus (device) which is connected through the base station 301. Moreover, the contract authentication information management database 250 is described in detail referring to FIG. 5.

The control unit 260 performs control relating to the communication that is performed between each wireless communication apparatus that is connected through the network 110. For example, the control unit 260 performs control for performing content provision processing, upload processing, or download processing (communication processing). Moreover, the content provision processing is the communication processing that provides content form the information processing apparatus 200 to the wireless communication apparatus 400 (for example, browsing of the website). Furthermore, the upload processing is the communication processing that uploads content from the wireless communication apparatus 400 to the information processing apparatus 200, and the download processing is the communication processing that downloads content from the information processing apparatus 200 to the wireless communication apparatus 400.

Furthermore, for example, the control unit 260 performs control for lending the connection right (the connection right that is used in providing a specific service) to the connection to a predetermined network using the wireless communication. In this case, the control unit 260 performs the control for lending to the wireless communication apparatus the connection right that is used only in providing a specific service (for example, browsing the website of the service provider 50). Furthermore, if a request to provide a specific service (for example, logging-in information illustrated in FIG. 14) is received, the control unit 260 performs the control for lending the connection right to the wireless communication apparatus that transmits the request. Furthermore, the control unit 260 can perform control for validating the connection right that is lent to the wireless communication apparatus at the timing of starting to provide a specific service, and for invalidating the connection right at the timing of ending providing the specific service. For example, the control for validating the connection right being lent to the wireless communication apparatus at the timing of starting to browse the website of the service provider 50, and for invalidating the connection right at the timing of ending browsing the web site of the service provider 50 is performed. At this point, the validation of the connection right corresponds to the validation of the contract authentication information, and the invalidation of the connection right corresponds to the invalidation of the contract authentication information.

Furthermore, using the wireless communication, the service provision unit 220 provides the wireless communication apparatus being connected using the lent connection right with a specific service. Moreover, the service provision unit 220 is one example a provision unit that is recited in the claims.

[Configuration Example of a Service Management Data]

FIG. 4 is a diagram schematically illustrating the service management database 240 according to the first embodiment of the present technology.

A user ID 241, a password 242, terminal identification information 243, and a type of terminal 244 are individually matched and stored in the service management database 240. These pieces of information, for example, are updated sequentially by the control unit 260, based on a request for a registration amendment from the service provider 50. For example, if the user of the wireless communication apparatus 400 enters into a contract to receive a predetermined service with the service provider 50, contents of the contract are reflected in and registered with the service management database 240.

An ID that is used when the user of the wireless communication apparatus is provided with the service (service that is received using the wireless communication apparatus) in accordance with the contract between the user and the service provider 50 is stored in the user ID 241.

A password that is used when the user of the wireless communication apparatus is provided with the service (service that is received using the wireless communication apparatus) in accordance with the contract between the user and the service provider 50 is stored in the password 242.

Terminal identification information for identifying the wireless communication apparatus in accordance with the contract between the user and the service provider 50 is stored in the terminal identification information 243. The terminal identification information is identification information (for example, a unique ID allocated to each device) for identifying the wireless communication apparatus. For example, an international mobile equipment identity (IMEI) is stored in the terminal identification information 243. Moreover, the IMEI is expressed using a 15-digit number, but for ease of description, the IMEI is expressed as "AAAA", "BBBB", and so forth in FIG. 4 and the like. For example, "CCCC" in the terminal identification information 243 is assumed to correspond to the wireless communication apparatus 400.

The type of the wireless communication apparatus in accordance with the contract between the user of the wireless communication apparatus and the service provider 50 is stored in the type of terminal 244. Moreover, for ease of description, the type of terminal is expressed as "electronic book A", "portable B", "smart C", and so forth in FIG. 4.

In this manner, the service management database 240 manages the wireless communication apparatus to which a specific service can be provided. Furthermore, the management information that includes at least one, among the identification information, the password, and model information (type of terminal) for specifying the wireless communication apparatus to which a specific service can be provided, is stored in the service management database 240. Moreover, the identification information for identifying the wireless communication apparatus to which a specific service can be provided, for example, is the terminal identification information or the user ID.

Furthermore, for example, the control unit 260 determines whether or not the wireless communication apparatus can be provided with a specific service, based on contents of the management in the service management database 240. That is, based on whether or not there is consistency between the information, included in the provision request that is transmitted by the wireless communication apparatus, and the management information, the control unit 260 determines whether or not the wireless communication apparatus that transmits the provision request can be provided with the specific service. Then, the control unit 260 performs control for lending the connection right only to the wireless communication apparatus that is determined as being able to be provided with a specific service.

[Configuration Example of the Contract Authentication Information Management Database]

FIG. 5 is a diagram schematically illustrating the contract authentication information management database 250 according to the first embodiment of the present technology. Moreover, a transitional example is illustrated in FIGS. 5*a* and 5*b* in a case where the contract authentication information in a contract authentication information management number 251 "3" is lent.

A usage state 252, a loan destination 253, and loan time 254 are individually matched to the contract authentication information management number 251 and stored in the contract authentication information management database 250. That is, one piece of information is managed for every piece of contract authentication information that can be lent by the service provider 50, and an upper limit value of the contract authentication information that can be lent is managed.

The contract authentication information management number 251 is a number of managed items of the contract authentication information that can be lent by the service provider 50.

The usage state of the contract authentication information is stored in the usage state 252. In FIG. 5, for example, "in use" is assigned to the contract authentication information that is lent to the wireless communication apparatus, and "-" is assigned to the contract authentication information that is not lent to the wireless communication apparatus.

The wireless communication apparatus to which the contract authentication information is lent is stored in the loan destination 253. For example, the terminal identification information (for example, the terminal identification information 243 illustrated in FIG. 4) on the wireless communication apparatus is stored in the loan destination 253. Moreover, other pieces of information (for example, the user ID) by which to specify the wireless communication apparatus to which the contract authentication information is lent may be stored in the loan destination 253.

The time that elapses from when the contract authentication information is lent to the wireless communication apparatus is stored in the loan time 254.

In this manner, the contract authentication information management database 250 manages the connection right that is lent when a specific service is provided. Furthermore, the upper limit value of the wireless communication apparatus to which the connection right is lent is stored in the contract authentication information management database 250.

Furthermore, for example, the control unit 260 determines whether or not the connection right can be lent to the wireless communication apparatus, based on the contents of the management in the contract authentication information management database 250. That is, when a request to provide a specific service is received, if the number of the wireless communication apparatuses to which the connection right is lent does not reach the upper limit value, the control unit 260 determines that the connection right can be lent to the wireless communication apparatus. Then, the control unit 260 performs control for lending the connection right only on the wireless communication apparatus that is determined as an apparatus to which the connection right can be lent.

Furthermore, for example, the control unit 260 lends to the wireless communication apparatus the connection right to which a limit on a time of use (for example, can be used for one hour) is imposed, and if a predetermined time (for example, one hour) relating to the limit on the time of use elapses from when the connection right is lent, the control unit 260 can perform control for invalidating the lent connection right. For example, it is determined whether or not a predetermined time (for example, one hour) relating to such a limit elapses, based on the value that is stored in the loan time 254.

[Configuration Example of the Communication Control Apparatus]

Figure 6:
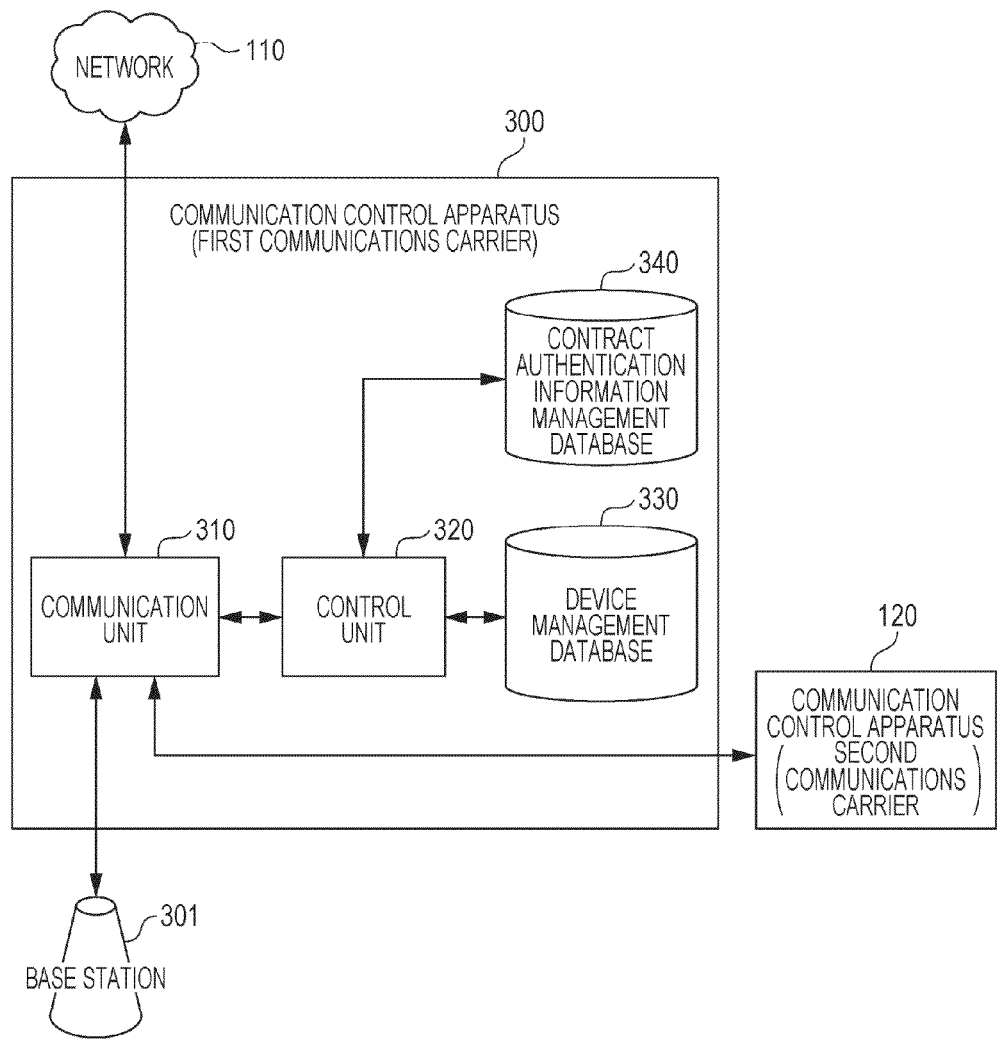
FIG. 6 is a block diagram illustrating a functional configuration example of a communication control apparatus (first communications carrier) 300 according to the first embodiment of the present technology.

FIG. 6 is a block diagram illustrating a functional configuration example of a communication control apparatus (first communications carrier) 300 according to the first embodiment of the present technology.

The communication control apparatus (first communications carrier) 300 includes a communication unit 310, a control unit 320, a device management database 330, and a contract authentication information management database 340.

The communication unit 310 is connected to the network 110, the communication control apparatus (second communications carrier) 120, and the base station 301, and performs the communication between each wireless communication apparatus that is connected through the base station 301, under the control of the control unit 320.

The control unit 320 performs various types of control relating to the wireless communication apparatus that is connected directly or through the communication control apparatus (second communications carrier) 120.

The device management database 330 is a database in which to store various pieces of information for managing each wireless communication apparatus (device) that is connected through the base station 301. Moreover, the device management database 330 is described in detail referring to FIG. 7.

The contract authentication information management database 340 is a database in which to store various pieces of information for managing the contract authentication information that is set to be in each wireless communication apparatus (device) that is connected through the base station 301. Moreover, the contract authentication information management database 340 is described in detail referring to FIG. 8.

[Configuration Example of the Device Management Database]

FIG. 7 is a diagram schematically illustrating the device management database 330 according to the first embodiment of the present technology.

Service identification information 331, terminal identification information 332, contract authentication information loan information 333, and a loan time 334 are individually matched and stored in the device management database 330. These pieces of information, for example, are updated sequentially by the control unit 320, based on a request from each wireless communication apparatus. Furthermore, a transitional example of the update is illustrated in FIGS. 7a and 7b. That is, FIG. 7a illustrates a state where the contract authentication information is lent to two wireless communication apparatuses, and FIG. 7b illustrates a state where the contract authentication information is lent to three wireless communication apparatuses (including the wireless communication apparatus 400).

The identification information for each service is stored in the service identification information 331. For example, a service (for example, a web size browsing service) that is provided by the service provider 50 is expressed as "G0001".

The terminal identification information for identifying each wireless communication apparatus is stored in the terminal identification information 332. Moreover, the terminal identification information 332 corresponds to the terminal identification information 243 illustrated in FIG. 4.

Information (contract authentication information loan information) for managing whether or not the contract authentication information is lent to the wireless communication apparatus is stored in the contract authentication information loan information 333. For example, if the contract authentication information is lent to the wireless communication apparatus, the management information (for example, the contract authentication information management number 251 illustrated in FIG. 5) on such a service is stored.

The time that elapses from when the contract authentication information is lent to the wireless communication apparatus is stored in the loan time 334. Moreover, the loan time 334 corresponds to the loan time 254 illustrated in FIG. 5.

[Configuration Example of the Contract Authentication Information Management Database]

FIG. 8 is a diagram schematically illustrating the contract authentication information management database 340 according to the first embodiment of the present technology.

Contract authentication information identification information 341 and terminal identification information 342 are individually matched and stored in the contract authentication information management database 340. These pieces of information, for example, are updated sequentially by the control unit 320, based on a request from each wireless communication apparatus. Furthermore, a transitional example of the update is illustrated in FIGS. 8a and 8b.

As described above, it is assumed that the service provider 50 enters into a contract with the first communications carrier in advance and prepares a given number of the pieces of contract authentication information (for example, a contract authentication information pool) based on the contract. For this reason, when the user of the wireless communication apparatus uses a service that is provided by the service provider 50, the contract authentication information that is not in use, among the given number of the pieces of contract authentication information, is lent. In this manner, the given number of the pieces of contract authentication information (that is, the contract authentication information pool) that is lent to each wireless communication apparatus is managed by the contract authentication information management database 340.

The contract authentication information identification information for identifying the contract authentication information that is lent to each wireless communication apparatus is stored in the contract authentication information identification information 341.

The terminal identification information for identifying each wireless communication apparatus is stored in the terminal identification information 342. Moreover, the terminal identification information 342 corresponds to the terminal identification information 243 illustrated in FIG. 4.

[Configuration Example of the Wireless Communication Apparatus]

Figure 9:
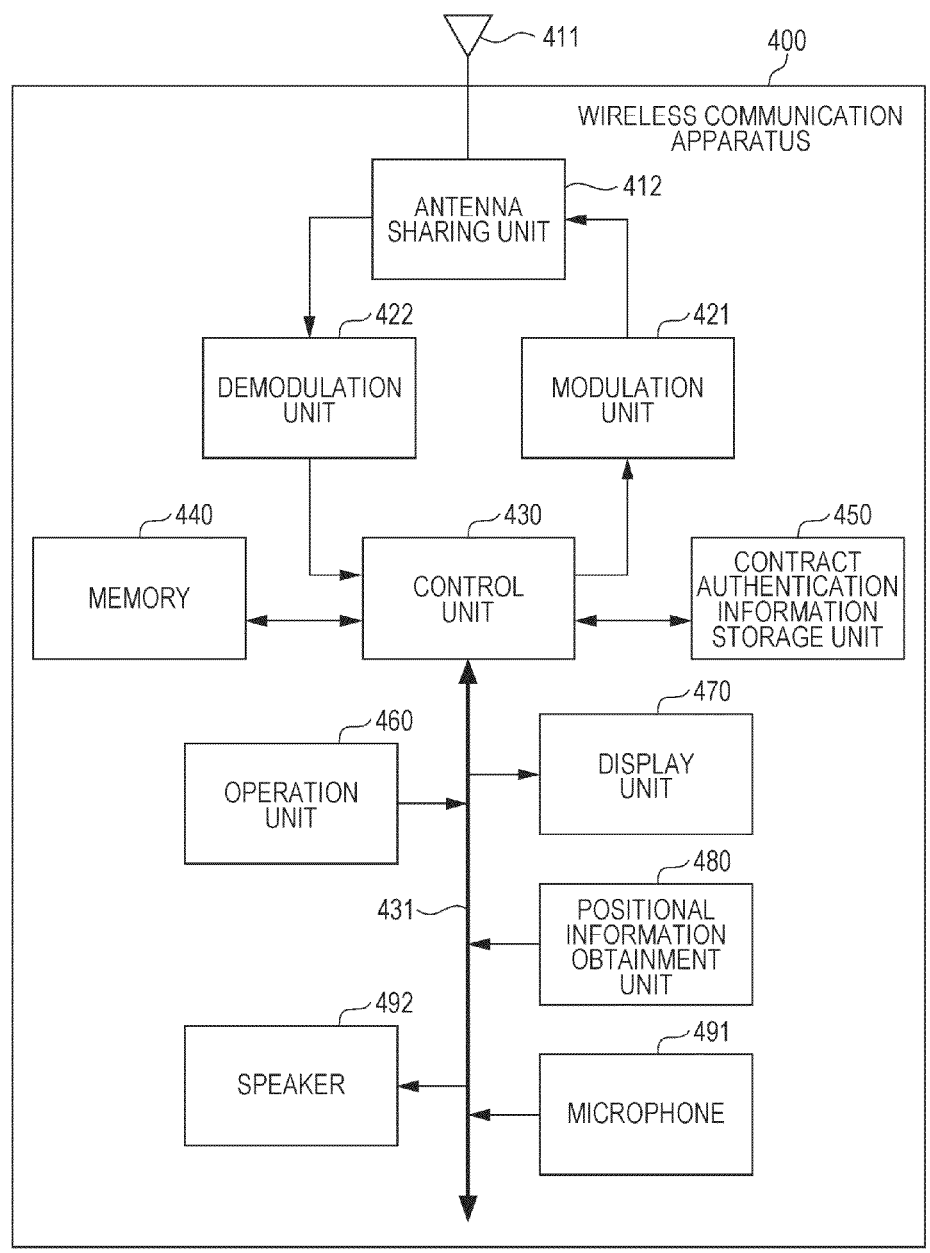
FIG. 9 is a block diagram illustrating an internal configuration example of a wireless communication apparatus 400 according to the first embodiment of the present technology.

FIG. 9 is a block diagram illustrating an internal configuration example of a wireless communication apparatus 400 according to the first embodiment of the present technology.

The wireless communication apparatus 400 includes an antenna 411, an antenna sharing unit 412, a modulation unit 421, a demodulation unit 422, a control unit 430, a memory 440, and a contract authentication information storage unit 450. Furthermore, the wireless communication apparatus 400 includes an operation unit 460, a display unit 470, a positional information obtainment unit 480, a microphone 491, and a speaker 492. Furthermore, these units are connected to one another by a bus 431.

For example, if reception processing is performed, an electromagnetic wave that is received by the antenna 411 passes through the antenna sharing unit 412, and is demodulated by the demodulation unit 422, and the demodulated reception data is supplied to the control unit 430. If the reception processing is call reception processing, the demodulated reception data (voice data) passes through the control unit 430 and is output, as audio, from the speaker 492.

Furthermore, for example, if transmission processing is performed, transmission data that is output by the control unit 430 is modulated by the modulation unit 421, and the modulated transmission data passes through the antenna sharing unit 412 and is transmitted from the antenna 411. If the transmission processing is call transmission, the voice data that is input from the microphone 491 passes through the control unit 430 and is modulated by the modulation unit 421, and the modulated transmission data (voice data) passes through the antenna sharing unit 412 and is transmitted from the antenna 411.

The control unit 430 performs various types of control, based on a control program that is stored in the memory 440. The control unit 430, for example, is configured from the microprocessor. For example, the control unit 430 is connected to the modulation unit 421 and the demodulation unit 422, and performs transmission and reception of various pieces of data that is performed between the wireless communication apparatus 400 and the communication control apparatus (second communications carrier) 120 that is connected through the base station 122. Furthermore, the control unit 430, for example, performs connection processing that connects the communication control apparatus (first communications carrier) 300 and the communication control apparatus (second communications carrier) 120 through the wireless line using a restricted connection based on the PCID without using the contract authentication information.

The memory 440 is a memory in which to store a control program necessary for the control unit 430 to perform various types of control, the transmission data, the reception data, and the like. The memory 440 is configured, for example, from a read only memory (ROM) or a random access memory (RAM). Furthermore, the terminal identification information (for example, the IMEI) for specifying the wireless communication apparatus 400 is stored in the memory 440.

The contract authentication information storage unit 450 is a memory that retains the contract authentication information. As the contract authentication information storage unit 450, for example, a universal integrated circuit card (UICC) may be used, and a dedicated memory for keeping the contract authentication information secure may be used. Moreover, if the UICC card is used as the contract authentication information storage unit 450, the UICC in which the validation and the invalidation of the contract authentication information are possible is used, not the UICC in which the contract authentication information is written fixedly. That is, the UICC is used on which validation processing and invalidation processing of the contract authentication information can be performed by the control unit 430, based on the information (setting information and invalidation information) that is received from the antenna 411 and is demodulated. Furthermore, the UICC is used on which revision processing of the contract authentication information can be performed. Moreover, for the validation processing and the invalidation processing of the contract authentication information, the validation processing and the invalidation processing that are stipulated in the Third Generation Partnership Project (3GPP) can be performed. Furthermore, the contract authentication information storage unit 450 may be provided within the memory 440 by securing a secure region in the memory 440.

The operation unit 460 is an operation application unit to which an operation input by the user is applied, and a signal according to the applied operation input is output to the control unit 430. The operation unit 460 includes various keys, such numeric keys and alphabetical keys. Furthermore, operations for performing the various communication services between the wireless communication apparatus 400 and the information processing apparatus 200 are applied to the operation unit 460.

The display unit 470 is a display unit on which various pieces of information (text information or temporal information or the like) are displayed under the control of the control unit 430. Each information (for example, display screens illustrated in FIGS. 11 to 13) for performing the various communication services between the wireless communication apparatus 400 and the information processing apparatus 200 are displayed on the display unit 470. Moreover, for example, a display panel, such as an organic electro luminescence (EL) panel, or a liquid crystal display (LCD) panel, can be used as the display unit 470. Moreover, the operation unit 460 and the display unit 470 can be integrally formed into a touch panel on which the operation input can be performed by a user's finger coming into contact with a display surface of the touch panel or by the user's finger coming in close proximity to the display surface.

The positional information obtainment unit 480 obtains positional information indicating a position in which the wireless communication apparatus 400 is present, and outputs the obtained positional information to the control unit 430. The positional information obtainment unit 480, for example, is realized as a GPS unit that calculates the positional information, based on a GPS signal which is received by a global positioning system (GPS) signal reception antenna (not illustrated). Each data relating to latitude, longitude, altitude, and the like at the time of receiving the GPS signal is included in the calculated positional information. Furthermore, a positional information obtainment apparatus may be used that obtains the positional information using another method of obtaining the positional information. For example, the positional information obtainment apparatus may be used that elicits positional information using access point information that results from a local area network (LAN) that is present in the vicinity and that obtains such positional information.

[Example of the use of the Wireless Communication Apparatus]

Figure 10:
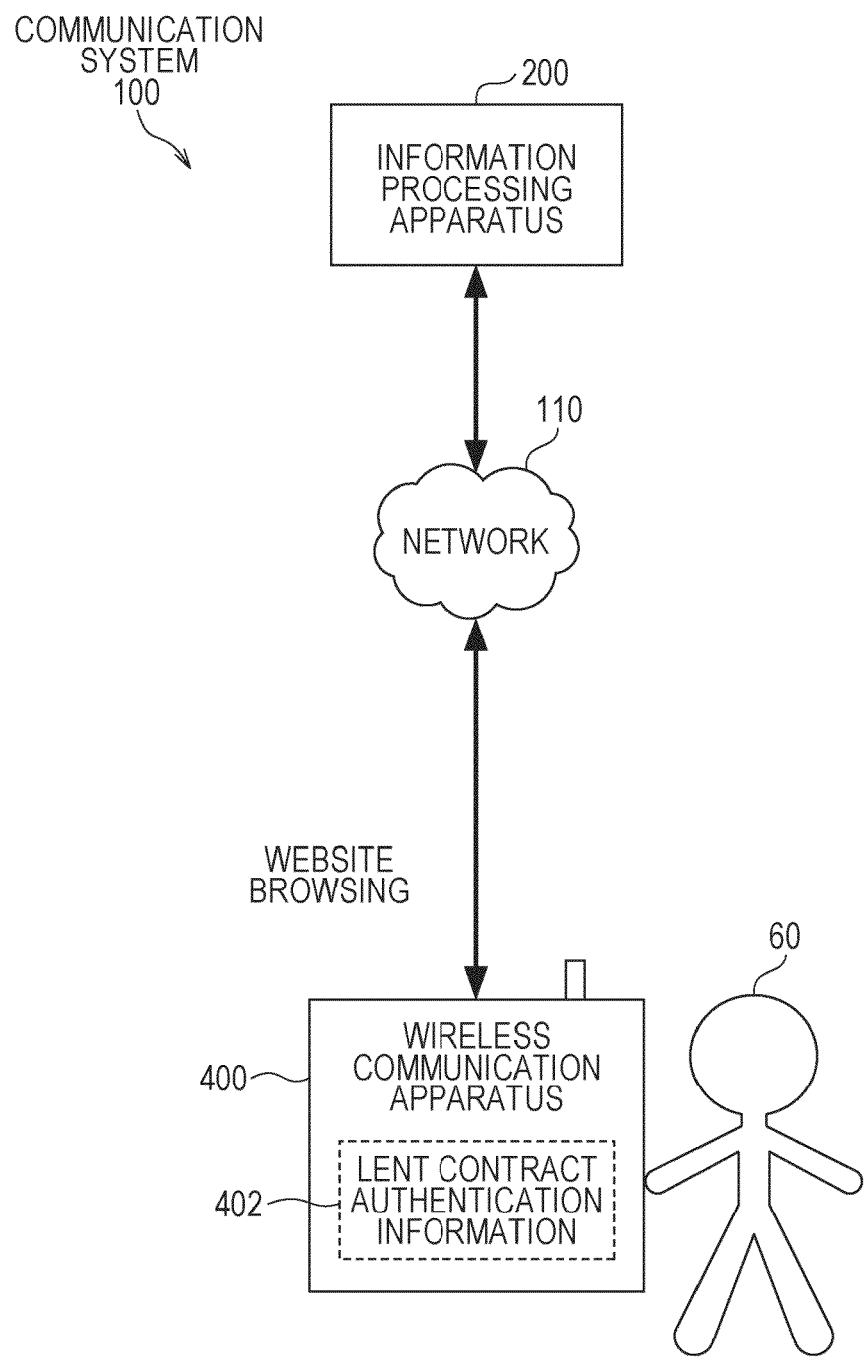
FIG. 10 is a diagram illustrating a simplified example of use of the wireless communication apparatus 400 according to the first embodiment of the present technology.

FIG. 10 is a diagram illustrating a simplified example of the use of the wireless communication apparatus 400 according to the first embodiment of the present technology. FIG. 10 illustrates a state where the website is browsed using the wireless communication apparatus 400.

In FIG. 10, it is assumed that the wireless communication apparatus 400 is a wireless communication apparatus (for example, a smart phone) which has a function of browsing the website, and can use the software downloadable SIM. Furthermore, the information processing apparatus 200 is assumed to be a server that can provide the website (for example, a shopping site).

At this point, an example of browsing the website that the information processing apparatus 200 provides using the wireless communication apparatus 400 is described. For example, it is assumed that, with the operation unit 460 of the wireless communication apparatus 400, the user 60 performs each operation for browsing the website that is provided from the information processing apparatus 200. A display example of such an operation screen is described in detail referring to FIG. 11 and the like.

Thus, it is assumed that the contract authentication information 401 which is retained in the wireless communication apparatus 400 is used if the website (for example, the shopping site) that is provided by the information processing apparatus 200 is browsed. In this case, the user of the wireless communication apparatus 400 bears all the communication costs that the browsing of the website incurs. For this reason, because the user of the wireless communication apparatus 400 cares about the communication cost, there is a concern that the user cannot look at the website carefully. In this manner, if the user of the wireless communication apparatus 400 cares about the communication cost and thus does not look at the website carefully, there is a concern that the number of selling opportunities will be decreased for the service provider 50 that provides the website (for example, the shopping site).

Then, according to the first embodiment of the present technology, when using a specific service provided by the service provider 50, contract authentication information 402 for using the specific service is lent and thus the user is properly provided with various services from the information processing apparatus 200.

[Transitional Example at the Time of Browsing the Website]

Figure 13:
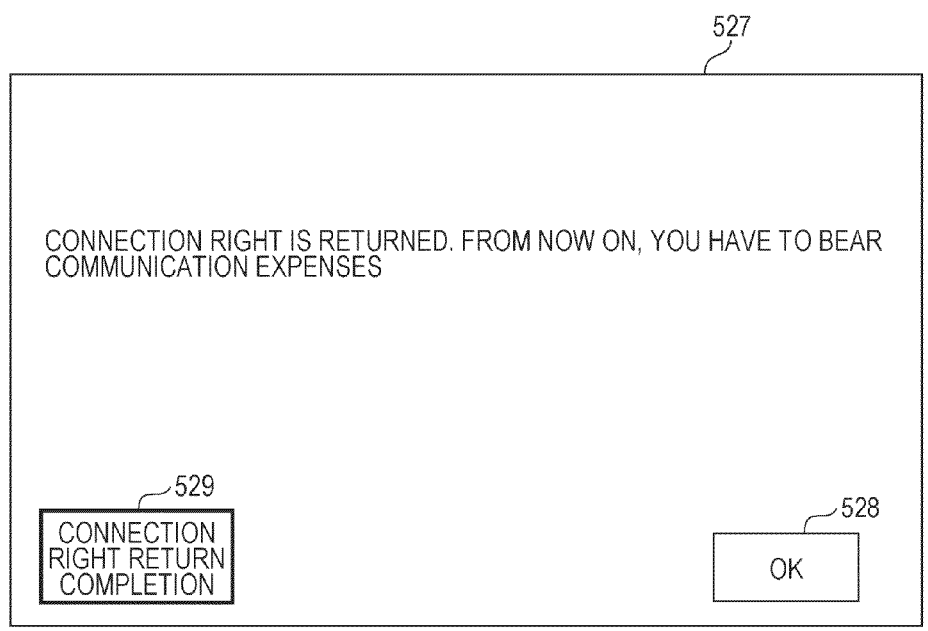
FIG. 13 is a diagram illustrating an example of the display screen that is displayed on the display unit 470 of the wireless communication apparatus 400 according to the first embodiment of the present technology.

FIGS. 11 to 13 are diagrams, each illustrating an example of a display screen that is displayed on the display unit 470 of the wireless communication apparatus 400 according to the first embodiment of the present technology. Each of these display screens, for example, is displayed based on each piece of information that is transmitted from the information processing apparatus 200.

FIG. 11a illustrates one example (a menu screen 500) of a menu screen for selecting a function that is executed by the wireless communication apparatus 400.

A call button 501, a camera button 502, an electronic mail button 503, a website connection button 504, a website connection (specific service) button 505, and any other button 506 are provided on the menu screen 500. Furthermore, a return button 507 and a confirmation button 508 are provided on the menu screen 500.

The call button 501 is a button that is pushed down to execute a call function. The camera button 502 is a button that is pushed down to execute a camera function. The electronic mail button 503 is a button that is pushed down to execute an electronic mail function. Furthermore, the website connection button 504 is a button that is pushed down to connect to the website. However, the website connection (specific service) button 505 is pushed down to connect to the website and to receive a specific service (for example, a service that is provided by the service provider 50). Any other button 506 is a button that is pushed down to execute any other function.

The website connection (specific service) button 505, as described above, is a button that is pushed down to receive a specific service (for example, a service that is provided by the service provider 50) after connecting to the website.

The return button 507, for example, is a button that is pushed down to return back to the display screen that has been displayed just previously.

The confirmation button 508 is a button that, after performing each of the operations (push-down operations) described above, is pushed down to confirm contents of the operation. For example, FIG. 11b illustrates a display example that results after the website connection (specific service) button 505 is pushed down and the confirmation button 508 is pushed down.

FIG. 11b illustrates an example of a display screen (logging-in screen 510) that is displayed after, on the menu screen 500 illustrated in FIG. 11a, the website connection (specific service) button 505 is pushed down and the confirmation button 508 is pushed down. The logging-in screen 510 is a display screen for transitioning to a website browsing screen 520 illustrated in FIG. 12a.

A user ID input region 511, a password input region 512, a cancellation button 513, and an OK button 514 are provided on the logging-in screen 510.

The user ID input region 511 is a region for inputting the user ID for using the service (service that is received using the wireless communication apparatus 400) in accordance with the contract between the user of the wireless communication apparatus 400 and the service provider 50.

The password input region 512 is a region for inputting the password for using the service (service that is received using the wireless communication apparatus 400) in accordance with the contract between the user of the wireless communication apparatus 400 and the service provider 50. That is, the user ID for the service in accordance with the contract between the user of the wireless communication apparatus 400 and the service provider 50 is input into the user ID input region 511, and the password for the service is input into the password input region 512. Specifically, the information that is stored in the user ID 241 that is illustrated in FIG. 4 is input into the user ID input region 511, and the information that is stored in the password 242 that is illustrated in FIG. 4 is input into the password input region 512. Moreover, the password is expressed as "**" in FIG. 13** because the password is not displayed on the actual screen from the perspective of security.

In this manner, when the pieces of information are input into the user ID input region 511 and the password input region 512, respectively, and the OK button 514 is pushed down, the transitioning to a website browsing screen for browsing the website takes place. Such a display example is illustrated in FIG. 12a.

Furthermore, when the OK button 514 is pushed down after inputting each of the pieces of information, the control unit 430 transmits to the information processing apparatus 200 the logging-in information (illustrated in FIG. 14) including each of the pieces of information that are input. Based on the logging-in information, the information processing apparatus 200 lends the contract authentication information to the wireless communication apparatus 400.

Moreover, the cancellation button 513 is pushed down to cancel the contents that are input into each of the user ID input region 511 and the password input region 512.

FIG. 12a illustrates an example of a display screen (web site browsing screen 520) that is displayed after, on the logging-in screen 510 illustrated in FIG. 11b, each information is input into the user ID input region 511 and the password input region 512 and the OK button 514 is pushed down.

A return button 521, a forward button 522, a connection right, and a region 523 for displaying the connection right on loan are provided on the website browsing screen 520.

The return button 521 is a button that is pushed down to return to the display screen that has been displayed just previously. The forward button 522 is a button that is pushed down to proceed to the next display screen (commodity purchase screen 524 that is illustrated in FIG. 12b).

The region 523 for displaying the connection right on loan is a region for notifying the user that the service provider 50 lends the connection right (that the contract authentication information is lent). The region 523 for displaying the connection right on loan may be displayed in a blinking manner or may be displayed with an attention-attracting color, in such a manner that the user can easily recognize such a notification.

FIG. 12*b* illustrates an example of a display screen (commodity purchase screen 524) that is displayed after the forward button 522 is pushed down on the website browsing screen 520 illustrated in FIG. 12*a*.

A purchase-target commodity (for example, a penguin or a crab) and a button for purchasing the purchase-target commodity are displayed on the commodity purchase screen 524 in a manner that corresponds to each other, and a communication service ending button 525 and a region 526 for displaying the connection right on loan are provided on the commodity purchase screen 524. Moreover, in the commodity purchase screen 524, the user can sequentially change and display the purchase-target commodities by pushing down left and right arrow buttons. Furthermore, for ease of description, illustrations and descriptions of other pieces of information that are displayed on the commodity purchase screen 524 are omitted.

The region 526 for displaying the connection right on loan is a region for notifying the user that the service provider 50 lends the connection right in the same manner as the region 523 for displaying the connection right on loan, which is displayed in FIG. 12*a*. However, in the immediately-preceding screen (website browsing screen 520), because it is considered that in most cases, the user recognizes such a notification, the region 526 for displaying the connection right on loan may be displayed in a small size and may be displayed in a not-attention-attracting color.

The communication service ending button 525 is a button that is pushed down to end the use of the communication service (communication service that uses the connection right being lent) that is performed between the wireless communication apparatus 400 and the information processing apparatus 200.

When the communication service ending button 525 is pushed down, the control unit 430 transmits a logging-out request (illustrated in FIG. 15) to the information processing apparatus 200. Based on the logging-out request, the information processing apparatus 200 retrieves the contract authentication information that is lent to the wireless communication apparatus 400. In this manner, a display example that is displayed after the communication service ending button 525 is pushed down is illustrated in FIG. 13.

FIG. 13 illustrates an example of a display screen (connection right return notification screen 527) that is displayed after the communication service ending button 525 is pushed down on the commodity purchase screen 524 illustrated in FIG. 12*b*.

The connection right return notification screen 527 is a display screen for notifying the user that the connection right lent by the service provider 50 has been returned, and an OK button 528 and a region 529 for displaying the connection right the returning of which is finished are provided on the connection right return notification screen 527.

The OK button 528 is a button that is pushed down to proceed to the next display screen (for example, the menu screen 500 illustrated in FIG. 11*a*).

The region 529 for displaying the connection right the returning of which is finished is a region for notifying the user that the connection right lent by the service provider 50 has been returned.

[Example of the Communication in a Case of Browsing of the Website]

Figure 14:
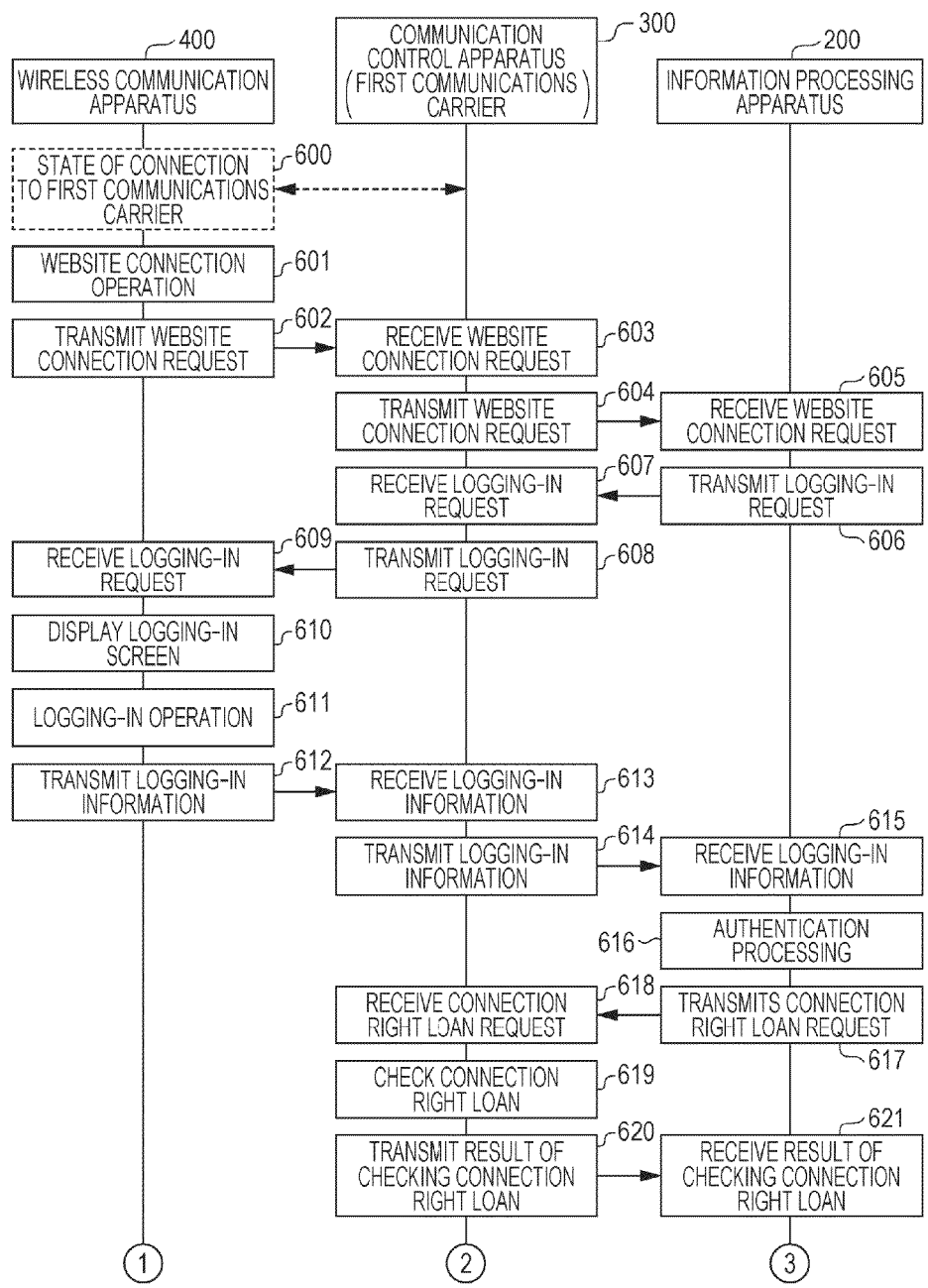
FIG. 14 is a sequence chart illustrating an example of communication processing between each apparatus that makes up the communication system 100 according to the first embodiment of the present technology.
Figure 15:
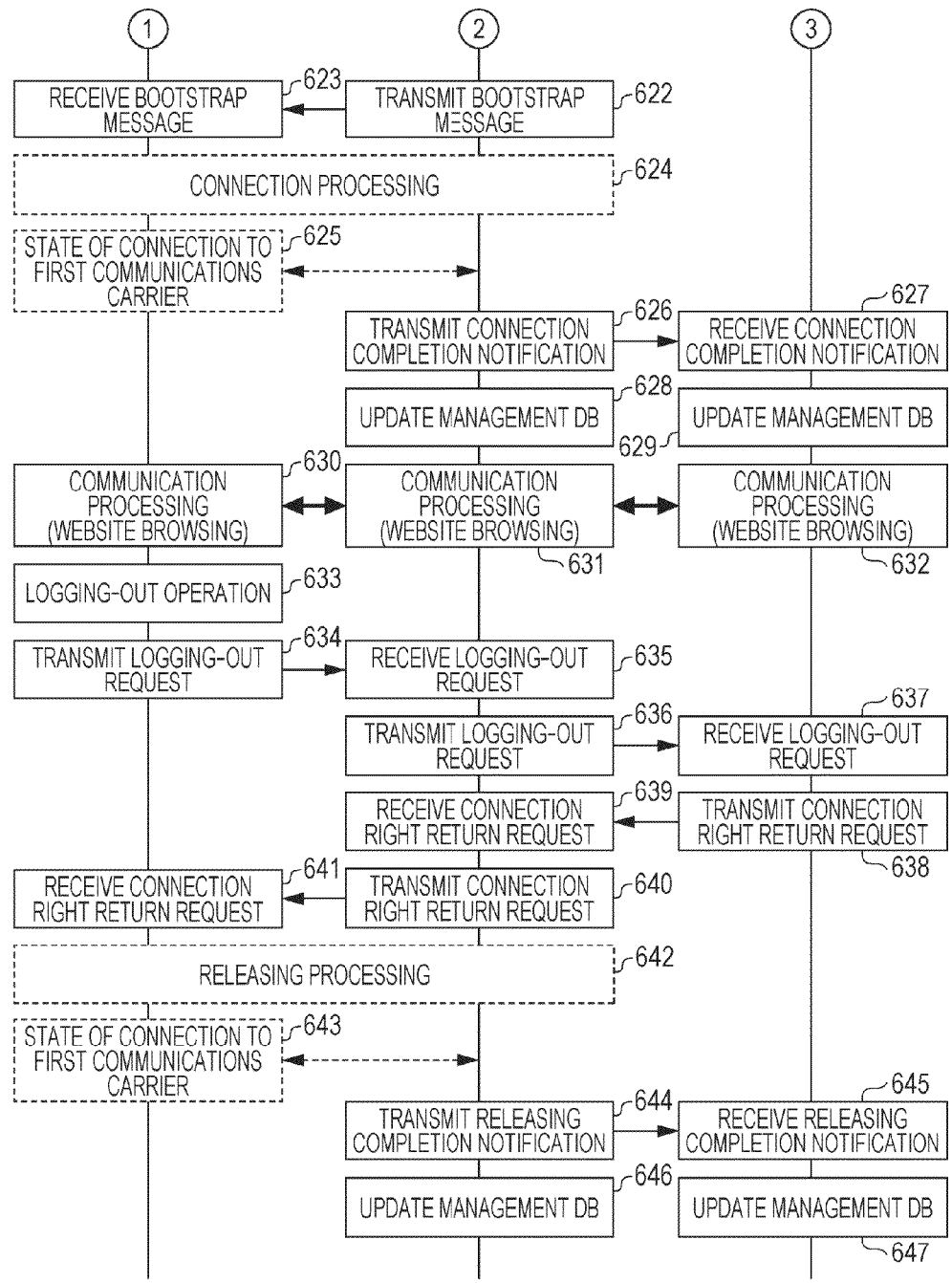
FIG. 15 is a sequence chart illustrating an example of the communication processing between each apparatus that makes up the communication system 100 according to the first embodiment of the present technology.

FIGS. 14 and 15 are sequence charts, each illustrating an example of the communication processing between each apparatus that makes up the communication system 100 according to the first embodiment of the present technology.

In this example, the wireless communication apparatus 400 is assumed to retain the contract authentication information (contract authentication information provided by the first communications carrier). Furthermore, it is assumed that the user of the wireless communication apparatus 400 enters into the contract to be provided with the service that is owned by the service provider 50. For this reason, if the website is browsed, the wireless communication apparatus 400 can connect to the communication control apparatus (first communications carrier) 300 using the contract authentication information lent by the service provider 50 without using the contract authentication information.

That is, the service provider 50 lends the contract authentication information only if the wireless communication apparatus used by the user, in accordance with the contract between the user and the service provider 50, uses the service relating to the contract. Moreover, an initial state is assumed to be a connection state (600) in which the wireless communication apparatus 400 is connected to the communication control apparatus (first communications carrier) 300. Furthermore, it is assumed that the contract authentication information retained in advance in the wireless communication apparatus 400 is used for the communication until the contract authentication information is lent.

Initially, an operation of connecting to the website using the wireless communication apparatus 400 is performed (601). For example, on the menu screen 500 illustrated in FIG. 11*a*, the website connection (specific service) button 505 is pushed down and the confirmation button 508 is pushed down, and thus the operation for connecting to the website is performed (601). In the operation for connecting to the website is performed (601), a website connection request is transmitted to the information processing apparatus 200 (602 to 605). That is, the control unit 430 of the wireless communication apparatus 400 transmits the website connection request to the information processing apparatus 200 through the communication control apparatus (first communications carrier) 300 (602 to 605).

If the information processing apparatus 200 receives the website connection request (605), under the control of the control unit 260, the service provision unit 220 of the information processing apparatus 200 transmits a logging-in request to the wireless communication apparatus 400 (606 to 609). That is, information (logging-in request) for performing logging-in necessary to connect to the website that the user desires is transmitted to the wireless communication apparatus 400 through the communication control apparatus (first communications carrier) 300 (606 to 609).

If the wireless communication apparatus 400 receives the logging-in request (609), based on the logging-in request, the control unit 430 of the wireless communication apparatus 400 displays a logging-in screen on the display unit 470 (610). For example, the logging-in screen 510 illustrated in FIG. 11*b* is displayed (610).

Subsequently, a logging-in operation is performed on the logging-in screen that is displayed on the display unit 470 (611). For example, on the logging-in screen 510 illustrated in FIG. 11*b*, the pieces of information are input into the user ID input region 511 and the password input region 512, respectively, and the OK button 514 is pushed down (611). In this manner, if a logging-in operation is performed on the logging-in screen (611), the control unit 430 of the wireless communication apparatus 400 transmits logging-in information according to the logging-in operation to the information processing apparatus 200 (612 to 615). That is, the logging-in information according to the logging-in operation is transmitted from the wireless communication apparatus 400 to the information processing apparatus 200 through the communication control apparatus (first communications carrier) 300 (612 to 615). At this point, as the logging-in information according to the logging-in operation, for example, the user ID, the password, the terminal identification information, the type of terminal, and the information indicating the correspondence to the software downloadable SIM are transmitted.

If the information processing apparatus 200 receives the logging-in information (615), the control unit 260 of the information processing apparatus 200 performs the authentication processing on the wireless communication apparatus 400 that transmits the logging-in information (616). The authentication processing is authentication processing for checking whether or not the contact authentication information can be lent to the wireless communication apparatus 400 that transmits the logging-in information.

Specifically, the control unit 260 compares the logging-in information with each of the contents of the service management database 240 and thus performs the authentication processing (616). That is, it is determined whether or not the user ID 241, the password 242, the terminal identification information 243, and the type of terminal 244 in the service management database 240 are consistent with the user ID, the password, the terminal identification information, and the type of terminal that are included in the logging-in information, respectively. Then, if consistency is ensured in each of the user ID, the password, the terminal identification information and the type of terminal, it is determined that the contract authentication information can be lent. On the other hand, if consistency is not ensured in at least one among the user ID, the password, the terminal identification information and the type of terminal, it is determined that the contract authentication information cannot be lent. In this manner, if the contract authentication information cannot be lent (that is, if the authentication fails), a notification to that effect is transmitted to the wireless communication apparatus 400 and is displayed, and performing the logging-in operation again is prompted. Furthermore, an error notification is transmitted to the wireless communication apparatus 400 and thus may be displayed. In this manner, if the authentication fails, Web site connection processing is ended.

Moreover, a device type or a device feature (an owner or the presence or absence of a detailed function) is individually matched and stored in the service management database 240, and according to each of these pieces of information, the selecting or loan of the contract authentication information that is to be lent may be limited or prohibited. For example, if a specific type of device is present and a specific owner (for example, an owner who has not delayed paying a membership fee) is present, the limit (limit on the time of use) on the contract authentication information that is to be lent may be relaxed.

Furthermore, if it is determined that the contract authentication information can be lent (that is, the authentication succeeds), the control unit 260 checks whether or not the wireless communication apparatus the authentication of which succeeds corresponds to the software downloadable SIM (616). If the wireless communication apparatus the authentication of which succeeds does not correspond to the software downloadable SIM, the communication processing that provides the website is performed without lending the contract authentication information to the wireless communication apparatus.

Furthermore, if it is determined that the contract authentication information can be lent (616), the control unit 260 of the information processing apparatus 200 transmits a connection right loan request to the communication control apparatus (first communications carrier) 300 (617 and 618). Information (for example, the terminal identification information) for specifying the wireless communication apparatus that is the loan destination is included in the connection right loan request.

If the communication control apparatus (first communications carrier) 300 receives the connection right loan request (618), the control unit 320 of the communication control apparatus (first communications carrier) 300 checks the connection right relating to the connection right loan request (619). For example, the control unit 320 checks whether or not the connection right relating to the connection right loan request can be lent, based on the contents of the contract authentication information management database 340 (619). For example, if the connection right that is lent reaches an upper limit value, it is determined that the connection right cannot be lent. Then, the control unit 320 transmits a result of the checking (result of checking the connection right loan) to the information processing apparatus 200 (620 and 621).

Moreover, if with the checking process, it is determined that the contract authentication information cannot be lent (619), the result (failure) of checking the connection right loan to that effect is transmitted to the information processing apparatus 200 (620 and 621).

If with the checking processing, it is determined that the contract authentication information can be lent (619), the control unit 320 of the communication control apparatus (first communications carrier) 300 transmits to the information processing apparatus 200 the result (success) of checking the connection right loan to that effect (620 and 621).

Furthermore, if with the checking processing, it is determined that the contract authentication information can be lent (619), the control unit 320 of the communication control apparatus (first communications carrier) 300 transmits a bootstrap message to the wireless communication apparatus 400 (622 and 623). At this point, the bootstrap message is a trigger for starting processing that enables the wireless communication apparatus 400 to actually obtain the contract authentication information (for example, refer to NPL 1 (5.1.3.6.3)).

Moreover, this example illustrates that the communication control apparatus (first communications carrier) 300 transmits the bootstrap message to the wireless communication apparatus 400, and the contract authentication information that is to be lent is obtained by the wireless communication apparatus 400. However, under the control of the information processing apparatus 200, such processing may be performed by the wireless communication apparatus 400. For example, the information processing apparatus 200 may transmit to the wireless communication apparatus 400 a request for downloading the contract authentication information that is to be lent, or a request for validating the contract authentication information that is to be lent, and may cause the wireless communication apparatus 400 to perform such processing.

If the bootstrap message is received (623), the control unit 430 of the wireless communication apparatus 400 performs processing (connection processing) for connecting (for reconnecting using the lent contract authentication information) to the communication control apparatus (first communications carrier) 300 (624). In this connection processing, the wireless communication apparatus 400 obtains the contract authentication information (lent contract authentication information) and thus performs the processing for re-connecting to the communication control apparatus (first communications carrier) 300. With the connection processing, the wireless communication apparatus 400 is brought into a connection state (625) where the wireless communication apparatus 400 is connected to the communication control apparatus (first communications carrier) 300, using the lent contract authentication information. Moreover, the connection processing is described referring to FIG. 16.

Furthermore, after the connection processing is finished (624), the control unit 320 of the communication control apparatus (third communications carrier) 300 transmits to the information processing apparatus 200 a connection completion notification for notifying that the wireless communication apparatus 400 is connected (626 and 627). The terminal identification information on the wireless communication apparatus (wireless communication apparatus 400) that is connected to the communication control apparatus (first communications carrier) 300 is included in the connection completion notification.

Furthermore, after the connection completion notification is transmitted (626), the control unit 320 of the communication control apparatus (first communications carrier) 300 records in each database the notification that the contract authentication information is lent to the wireless communication apparatus 400 and updates each of these databases (628). That is, the notification that the contract authentication information is lent to the wireless communication apparatus 400 is recorded in the device management database 330 and the contract authentication information management database 340, and the device management database 330 and the contract authentication information management database 340 are updated (628). In the device management database 330, for example, contents of the contract authentication information loan information 333 are changed from a state illustrated in FIG. 7a to a state illustrated in FIG. 7b (loan to the terminal identification information 332 "CCCC"). Furthermore, in the contract authentication information management database 340, for example, contents of the terminal identification information 342 are changed from a state illustrated in FIG. 8a to a state illustrated in FIG. 8b.

Furthermore, when the connection completion notification is received (627), the control unit 260 of the information processing apparatus 200 records in each database the notification that the contract authentication information is lent to the wireless communication apparatus 400, and updates each of these the databases (629). That is, the notification that the contract authentication information is lent to the wireless communication apparatus 400 is recorded in the contract authentication information management database 250, and thus the contract authentication information management database 250 is updated (629). For example, contents of the contract authentication information management database 250 are changed from a state illustrated in FIG. 5a to a state illustrated in FIG. 5b (loan to "CCCC").

Furthermore, when the connection processing is finished (624), the wireless communication apparatus 400 is brought into the connection state (625), based on the lent contract authentication information, between the wireless communication apparatus 400 and the communication control apparatus (first communications carrier) 300. For this reason, the wireless communication apparatus 400 connects to the information processing apparatus 200 through the communication control apparatus (first communications carrier) 300, and can perform the communication processing between the wireless communication apparatus 400 and the information processing apparatus 200 (630 to 632). That is, the wireless communication apparatus 400 is in a state where a communication service (browsing of the website) can be used over the network (for example, the Internet) 110 (630 to 632). For example, the website browsing screen 520 illustrated in FIG. 12a is displayed. Furthermore, if the forward button 522 is pushed down, the commodity purchase screen 524 illustrated in FIG. 12b is displayed on the website browsing screen 520.

In this manner, the wireless communication apparatus 400 performs the communication processing that browses the website that is provided by the information processing apparatus 200, through the communication control apparatus (first communications carrier) 300 (630 to 632). For example, illustrated in FIG. 10, the control unit 430 of the wireless communication apparatus 400 performs control for displaying the website being provided by the information processing apparatus 200 on the display unit 470. For example, the commodity purchase screen 524 illustrated in FIG. 12b is displayed. In this manner, the user of the wireless communication apparatus 400 can browse the website being provided by the service provider 50 in a communication-cost-free state, using the contract authentication information lent by the service provider 50.

In this manner, after the browsing of the website is browsed, if the browsing of the website is finished (if the use of the service is finished), the user of the wireless communication apparatus 400 performs a logging-out operation (633). For example, on the commodity purchase screen 524 illustrated in FIG. 12b, the communication service ending button 525 is pushed down, and thus the logging-out operation is performed (633). If the logging-out operation is performed (633), the logging-out request is transmitted to the information processing apparatus 200 (634 to 637). That is, the control unit 430 of the wireless communication apparatus 400 transmits the logging-out request to the information processing apparatus 200 through the communication control apparatus (first communications carrier) 300 (634 to 637).

If the information processing apparatus 200 receives the logging-out request (637), the control unit 260 of the information processing apparatus 200 transmits a connection right return request to the communication control apparatus (first communications carrier) 300 (638 and 639). The connection right return request is a request for return of the lent connection right, and for example, the information (for example, the terminal identification information) for specifying the wireless communication apparatus that is the loan destination is included in the connection right return request.

If the connection right return request is received (639), the control unit 320 of the communication control apparatus (first communications carrier) 300 transmits the connection right return request to the wireless communication apparatus 400 (640 and 641). The connection right return request is used to request the wireless communication apparatus (wireless communication apparatus 400) being the loan destination to invalidate the contract authentication information.

If the connection right return request is received (641), the control unit 430 of the wireless communication apparatus 400 performs processing (releasing processing) for releasing the connection to the communication control apparatus (first communications carrier) 300 and invalidating the lent contract authentication information (642). In the releasing processing, the wireless communication apparatus 400 invalidates the lent contract authentication information and thus performs the processing for releasing the connection to the communication control apparatus (first communications carrier) 300. Moreover, the releasing processing is described in detail referring to FIG. 17.

Furthermore, after the releasing processing is finished, the control unit 320 of the communication control apparatus (first communications carrier) 300 transmits to the information processing apparatus 200 a releasing completion notification for notifying that the connection (connection based on the lent contract authentication information) to the wireless communication apparatus 400 is released (644 and 645). The terminal identification information on the wireless communication apparatus (wireless communication apparatus 400) whose connection to the communication control apparatus (first communications carrier) 300 is released is included in the releasing completion notification.

Furthermore, after the releasing completion notification is transmitted (644), the control unit 320 of the communication control apparatus (first communications carrier) 300 records in each database the notification that the contract authentication information is invalidated by the wireless communication apparatus 400 and updates each of these databases (646). That is, the notification that the contract authentication information is lent to the wireless communication apparatus 400 is deleted from the device management database 330 and the contract authentication information management database 340 and thus the device management database 330 and the contract authentication information management database 340 are updated (646).

Furthermore, when the releasing completion notification is received (645), the control unit 260 of the information processing apparatus 200 records in each database the notification that the contract authentication information is invalidated by the wireless communication apparatus 400, and updates each of these the databases (647). That is, the notification that the contract authentication information is lent to the wireless communication apparatus 400 is deleted from the contract authentication information management database 250, and thus the contract authentication information management database 250 is updated (647).

In this manner, the wireless communication apparatus 400 returns to the connection state where the wireless communication apparatus 400 is connected to the communication control apparatus (first communications carrier) 300, which is based on the original contract authentication information (643).

Moreover, it is assumed that before the user performs the logging-out operation, the wireless communication apparatus 400 ends the current session abnormally or a communication channel is no longer available. In such a case, the control unit 260 of the information processing apparatus 200 detects that the session is ended, performs each processing (638 to 642) relating to the return of the connection right, and thus can invalidate the contract authentication information (lent contract authentication information).

Furthermore, this example illustrates that if the user performs the logout operation, under the control of the information processing apparatus 200, the contract authentication information (lent contract authentication information) is invalidated in the wireless communication apparatus 400. However, if the user performs the logout operation, under the control of the control unit 430 of the wireless communication apparatus 400, the contract authentication information (lent contract authentication information) may be invalidated. In this case, each processing (634 to 641) subsequent to the logout operation can be omitted.

Furthermore, this example illustrates that the contract authentication information lent to the wireless communication apparatus 400 continues to be used until the user performs the logout operation. However, if a limit on the time of use is imposed to the contract authentication information, and the time (for example, the loan time 254 illustrated in FIG. 5) that elapses from when the contract authentication information is lent exceeds a limit value (for example, one hour), the lent contract authentication information may be invalidated. In this case, for example, under the control of the information processing apparatus 200, or under the control of the control unit 430 of the wireless communication apparatus 400, invalidation processing is performed.

[Example of the Communication in a Case of the Connection Processing]

Figure 16:
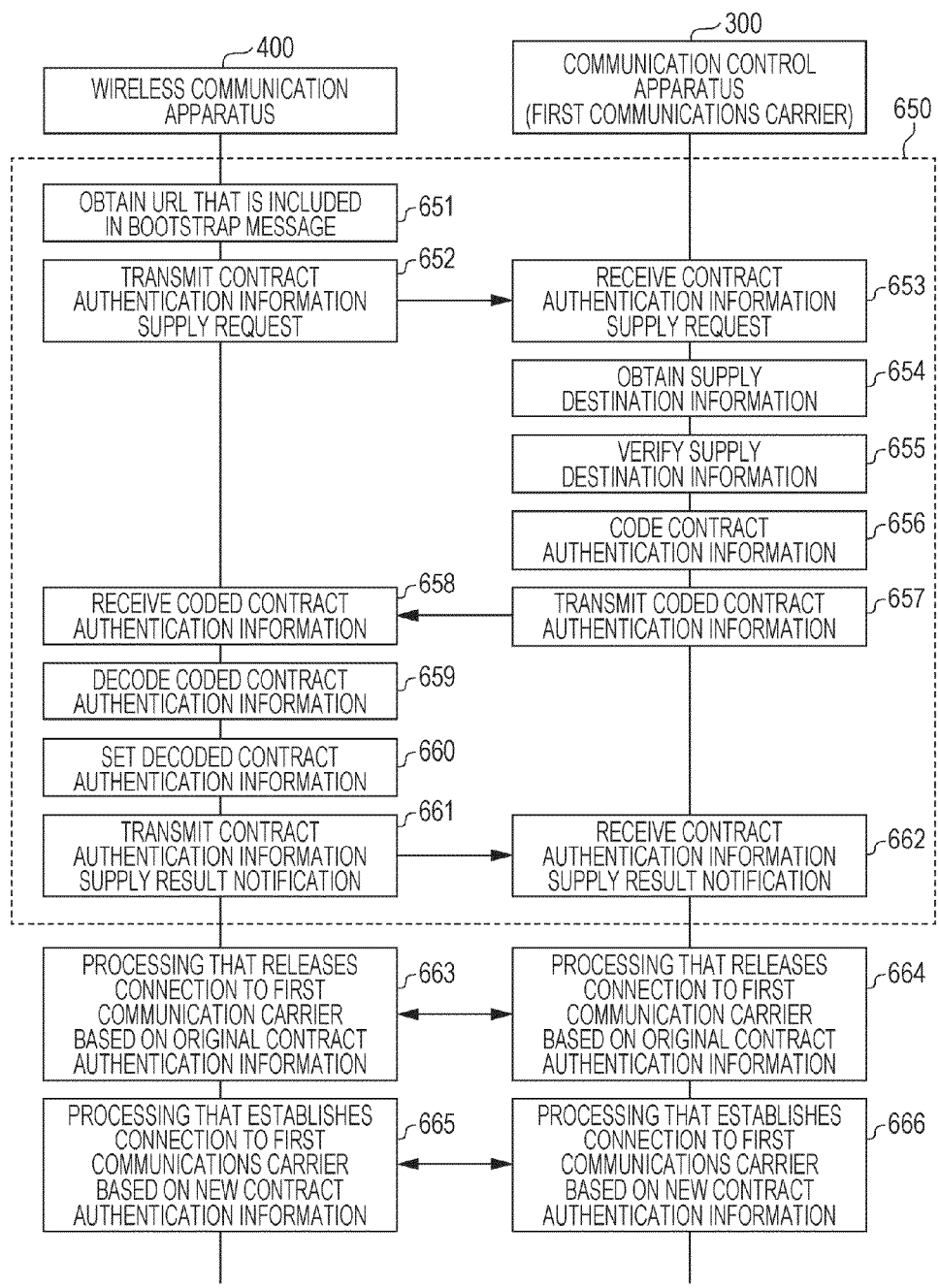
FIG. 16 is a sequence chart illustrating an example of the communication processing between each apparatus that makes up the communication system 100 according to the first embodiment of the present technology.

FIG. 16 is a sequence chart illustrating an example of the communication processing between each apparatus that makes up the communication system 100 according to one embodiment of the present technology. An example of the communication processing illustrated in FIG. 16 is processing that corresponds to the connection processing (624) illustrated in FIG. 15. That is, the example of the communication processing is illustrated in which the wireless communication apparatus 400 obtains the contract authentication information (lent contract authentication information) and thus connects to the communication control apparatus (first communications carrier) 300. Moreover, the communication processing enclosed by a dotted line 650 forming a rectangle is processing that corresponds to NPL 1 (5.1.3.6.3).

The control unit 430 of the wireless communication apparatus 400 that receives the bootstrap message obtains a uniform resource locator (URL) that is included in the received bootstrap message (651). Subsequently, the control unit 430 has access to the communication control apparatus (first communications carrier) 300 using the obtained URL, and transmits a contract authentication information supply request (652 and 653). The contract authentication information supply request is used to request for setting of the contract authentication information, and the terminal identification information on the wireless communication apparatus 400 is included in the contract authentication information supply request.

When the communication control apparatus (first communications carrier) 300 transmits the contract authentication information supply request (653), the control unit 320 of the communication control apparatus (first communications carrier) 300 obtains supply destination information (654). The supply destination information, for example, is information (for example, the terminal identification information) relating to the wireless communication apparatus that transmits the contract authentication information supply request.

Subsequently, the control unit 320 of the communication control apparatus (first communications carrier) 300 performs verification on the wireless communication apparatus that is specified by the obtained supply destination information (655). With this verification, for example, legitimacy of the device and the like are verified. For example, it is verified whether or not the device is a stolen commodity, whether or not the device is legitimately registered, and so forth. With this verification, if it is determined that the contract authentication information can be supplied to the wireless communication apparatus that is specified by the received supply determination information, a notification to that effect is transmitted to the wireless communication apparatus 400.

Furthermore, with the verification, if it is determined that the contract authentication information cannot be supplied to the wireless communication apparatus that is specified by the received supply destination information (655), the control unit 320 encodes the contract authentication information that is supplied to the wireless communication apparatus (656). Subsequently, the control unit 320 transmits the encoded contract authentication information to the wireless communication apparatus (wireless communication apparatus 400) that transmits the contract authentication information supply request (657 and 658).

When the wireless communication apparatus 400 receives the encoded contract authentication information (658), the control unit 430 of the wireless communication apparatus 400 decodes the encoded contract authentication information (659). Subsequently, the control unit 430 sets the decoded contract authentication information (660). That is, the control unit 430 stores the decoded contract authentication information in the contract authentication information storage unit 450, and sets the decoded contract authentication information to be in a usable state (provisioning) (660).

Subsequently, the control unit 430 transmits a notification of a result (result of provisioning) of supplying the contract authentication information to the communication control apparatus (first communications carrier) 300 (661 and 662).

Furthermore, after the decoded contract authentication information is set (660), the control unit 430 of the wireless communication apparatus 400 performs the releasing processing that releases the connection to the communication control apparatus (first communications carrier) 300, which is based on the original contract authentication information (663 and 664). At the time of the releasing processing, the wireless communication apparatus 400 may notify the communication control apparatus (first communications carrier) 300 of the terminal identification information on the wireless communication apparatus 400.

Subsequently, after the releasing processing on the wireless communication apparatus 400 and the communication control apparatus (first communications carrier) 300 is finished (663 and 664), the connection processing is performed (665 and 666). That is, the control unit 430 of the wireless communication apparatus 400 performs the connection processing for establishing the connection to the communication control apparatus (first communications carrier) 300, which is based on the lent contract authentication information (665 and 666). At the time of the connection processing, the wireless communication apparatus 400 may notify the communication control apparatus (first communications carrier) 300 of the terminal identification information on the wireless communication apparatus 400.

[Example of the Communication in a Case of the Releasing Processing]

Figure 17:
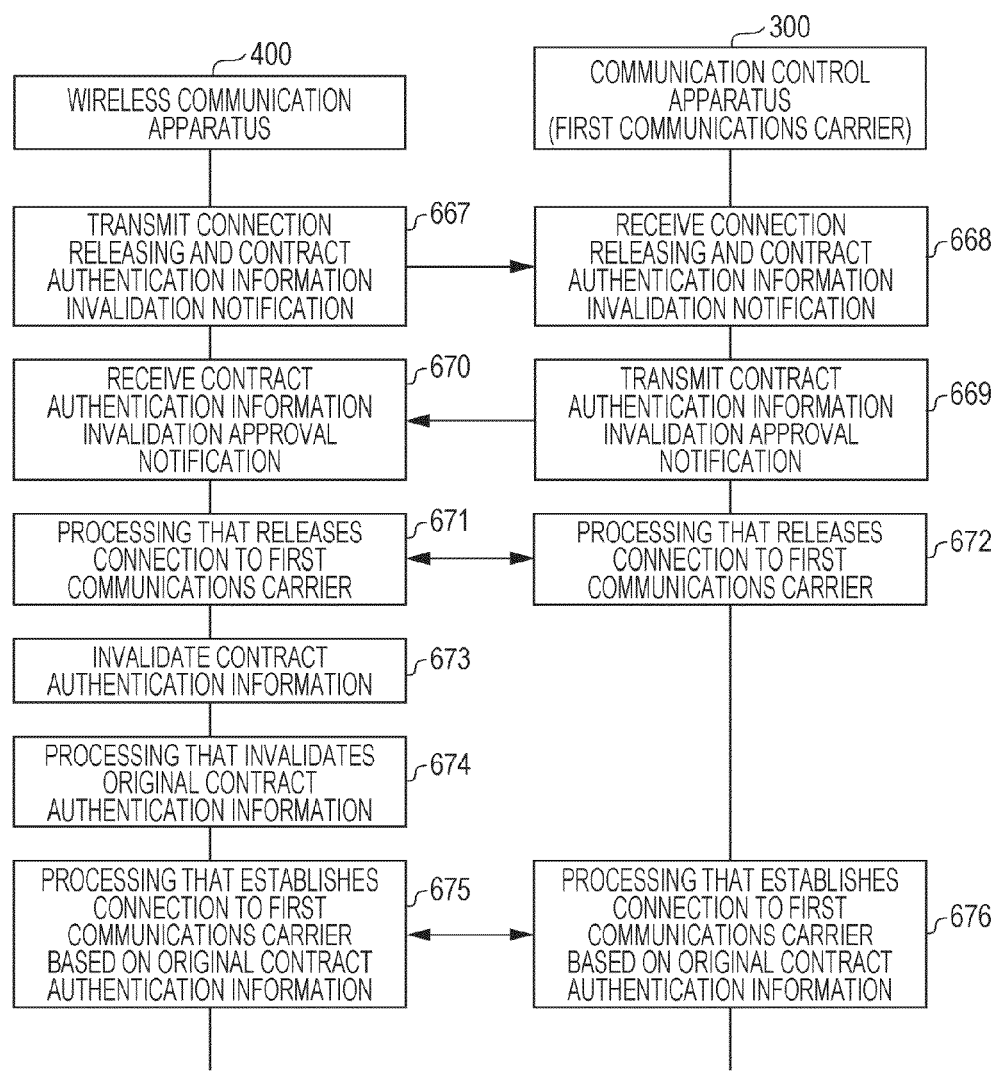
FIG. 17 is a sequence chart illustrating an example of the communication processing between each apparatus that makes up the communication system 100 according to the first embodiment of the present technology.

FIG. 17 is a sequence chart illustrating an example of the communication processing between each apparatus that makes up the communication system 100 according to one embodiment of the present technology. An example of the communication processing illustrated in FIG. 17 is processing that corresponds to the releasing processing (642) illustrated in FIG. 15. That is, the example of the communication processing is illustrated in which the wireless communication apparatus 400 releases the connection to the communication control apparatus (first communications carrier) 300, which is based on the lent contract authentication information.

The control unit 430 of the wireless communication apparatus 400 releases the connection to the communication control apparatus (first communications carrier) 300, and transmits to the communication control apparatus (first communications carrier) 300 a notification of the connection releasing and of contract authentication information invalidation to the effect that the lent contract authentications is invalidated (667 and 668). The terminal identification information on the wireless communication apparatus 400 is included in the contract authentication information supply request.

When the notification of the connection releasing and of the contract authentication information invalidation is received (668), the control unit 320 of the communication control apparatus (first communications carrier) 300 transmits to the wireless communication apparatus 400 a notification of a contract authentication information invalidation approval to the effect that the invalidation of the contract authentication information is approved (669 and 670). Moreover, it is assumed that the wireless communication apparatus that is specified by the terminal identification information that is included in the notification of the connection releasing and of the contract authentication information invalidation is not the wireless communication apparatus to which the contract authentication information is lent. In this case, the control unit 320 of the communication control apparatus (first communications carrier) 300 transmits to the wireless communication apparatus 400 the notification of the contract authentication information invalidation approval to the effect that the invalidation of the contract authentication information is not approved (669 and 670).

When the notification of the contract authentication information invalidation approval is received (670), the control unit 430 of the wireless communication apparatus 400 performs the releasing processing that releases the connection to the communication control apparatus (first communications carrier) 300 (671 and 672). At the time of the releasing processing, the wireless communication apparatus 400 may notify the communication control apparatus (first communications carrier) 300 of the terminal identification information on the wireless communication apparatus 400.

Subsequently, the control unit 430 of the wireless communication apparatus 400 performs the invalidation processing that invalidates the lent contract authentication information (673). In the invalidation processing, the lent contract authentication information may continue to be retained as the invalid contract authentication information, and the contract authentication information itself may be deleted.

Subsequently, the control unit 430 of the wireless communication apparatus 400 performs validation processing that validates the contract authentication information (original contract authentication information) that is retained in advance (674). That is, the original contract authentication information that is stored in the contract authentication information storage unit 450 is changed from an invalid state to a valid state.

Subsequently, the control unit 430 of the wireless communication apparatus 400 performs the connection processing for establishing the connection to the communication control apparatus (first communications carrier) 300, which is based on the original contract authentication information (675 and 676). At the time of the connection processing, the wireless communication apparatus 400 may notify the communication control apparatus (first communications carrier) 300 of the terminal identification information on the wireless communication apparatus 400.

[Example of Operation of the Information Processing Apparatus]

Figure 18:
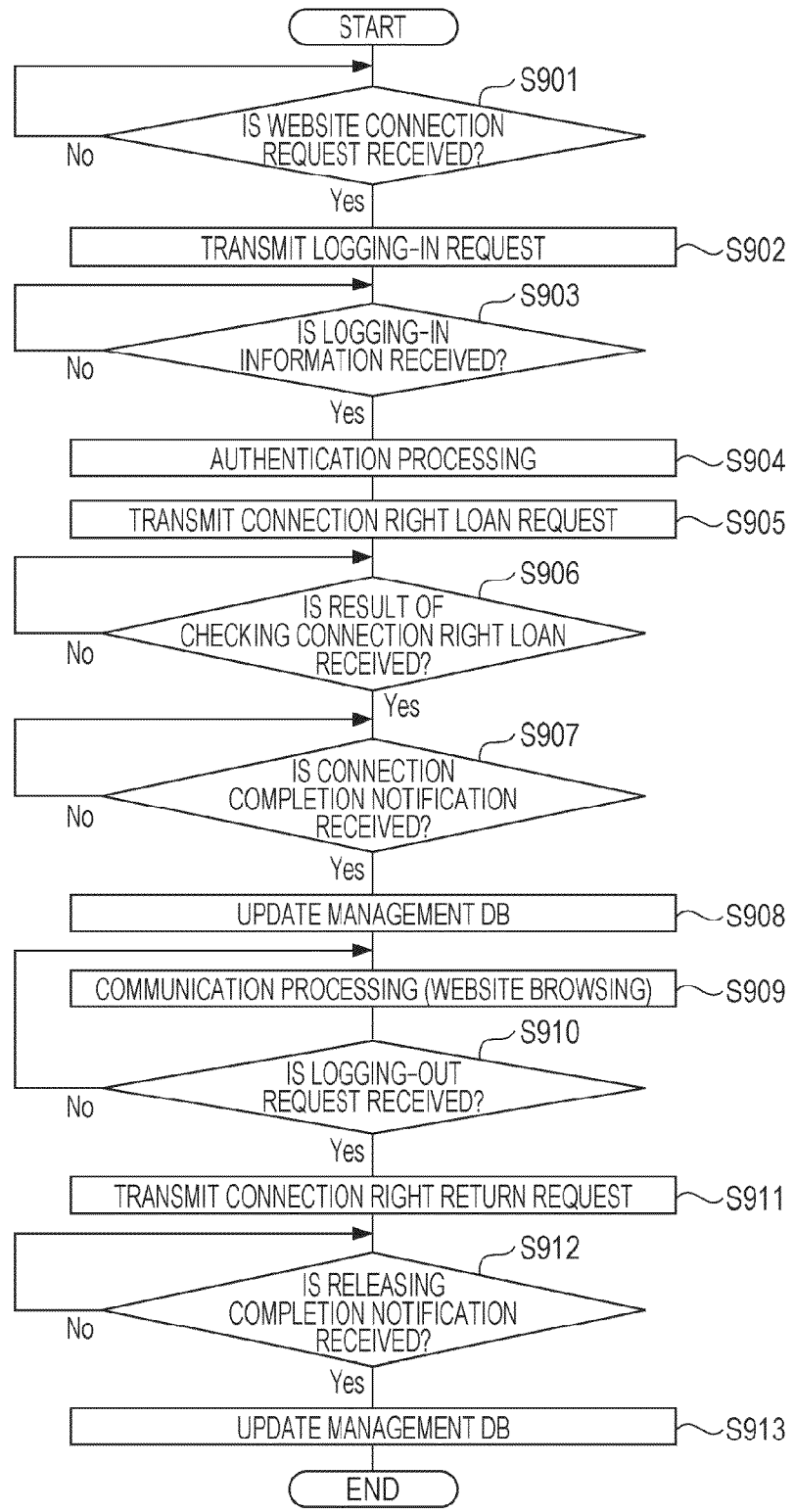
FIG. 18 is a flow chart illustrating one example of a processing process for the communication processing by an information processing apparatus 200 according to the first embodiment of the present technology.

FIG. 18 is a flow chart illustrating one example of a processing process for the communication processing by the information processing apparatus 200 according to the first embodiment of the present technology.

First, the control unit 260 determines whether or not the website connection request has been received (Step S901), and if the website connection request has not been received, continues to perform monitoring. On the one hand, if the website connection request has been received (Step S901), the service provision unit 220 transmits the logging-in request to the wireless communication apparatus that transmits the website connection request (Step S902).

Subsequently, the control unit 260 determines whether or not the logging-in information has been received (Step S903), and if the logging-in information has not been received, continues to perform the monitoring. On the other hand, if the logging-in information has been received (Step S903), the control unit 260 performs the authentication processing on the wireless communication apparatus that transmits the logging-in information (Step S904). If with the authentication processing, it is determined that the contract authentication information can be lent (Step S904), the control unit 260 transmits the connection right loan request to the communication control apparatus (first communications carrier) 300 (Step S905).

Subsequently, the control unit 260 determines whether or not the result (success) of checking the connection right loan to the effect that the contract authentication information can be lent has been received (Step S906), and if the result of checking the connection right loan to that effect has not been received, continues to perform the monitoring. On the one hand, if the result of checking the connection right loan to the effect that the contract authentication information can be lent has been received (Step S906), the control unit 260 determines whether or not the connection completion notification has been received (Step S907). If the connection completion notification has not been received, the control unit 260 continues to perform the monitoring. On the other hand, if the connection completion notification has been received (Step S907), the control unit 260 records in each database the notification that the contract authentication information is lent to the wireless communication apparatus, and updates each of these databases (Step S908). Moreover, Steps S901 and S908 are one example of a control process that is recited in the claims.

Subsequently, the communication processing (communication processing based on the lent contract authentication information) is performed between the information processing apparatus 200 and the wireless communication apparatus through the communication control apparatus (first communications carrier) 300 (Step S909). Subsequently, the control unit 260 determines whether or not the logging-out request has been received (Step S910). If the logging-out request has not been received, proceeding to Step S909 takes place. On the other hand, if the logging-out request has been received (Step S910), the control unit 260 transmits the connection right return request to the communication control apparatus (first communications carrier) 300 (Step S911). Moreover, Step S909 is one example of a communication process that is recited in the claims.

Subsequently, the control unit 260 determines whether or not the releasing completion notification has been received (Step S912), and if the releasing completion notification has not been received, continues to perform the monitoring. On the other hand, if the releasing completion notification has been received (Step S912), the control unit 260 records in each database the notification that the lent contract authentication information is invalidated, and updates each of these databases (Step S913).

2. Second Embodiment

According to the first embodiment, the example is illustrated in which the user of the wireless communication apparatus enters into a contract with the service provider, and based on the contract, performs the connection right loan. At this point, it is considered that even though the user of the wireless communication apparatus does not enter into a contract with the service provider in advance, the connection right is lent to the user and thus the communication service is provided.

Then, according to a second embodiment of the present technology, an example is illustrated in which even though the user does not enter into the contract with the service provider in advance, the connection right is lent to the user if a predetermined service (for example, download of a game) is provided. Moreover, a configuration of the communication system according to the second embodiment of the present technology is the same as illustrated in FIG. 2 and the like. For this reason, constituent elements that are common to the first and second embodiments according to the present technology are given like reference numerals, and some descriptions of these are omitted.

[Example of the Use of the Wireless Communication Apparatus]

Figure 19:
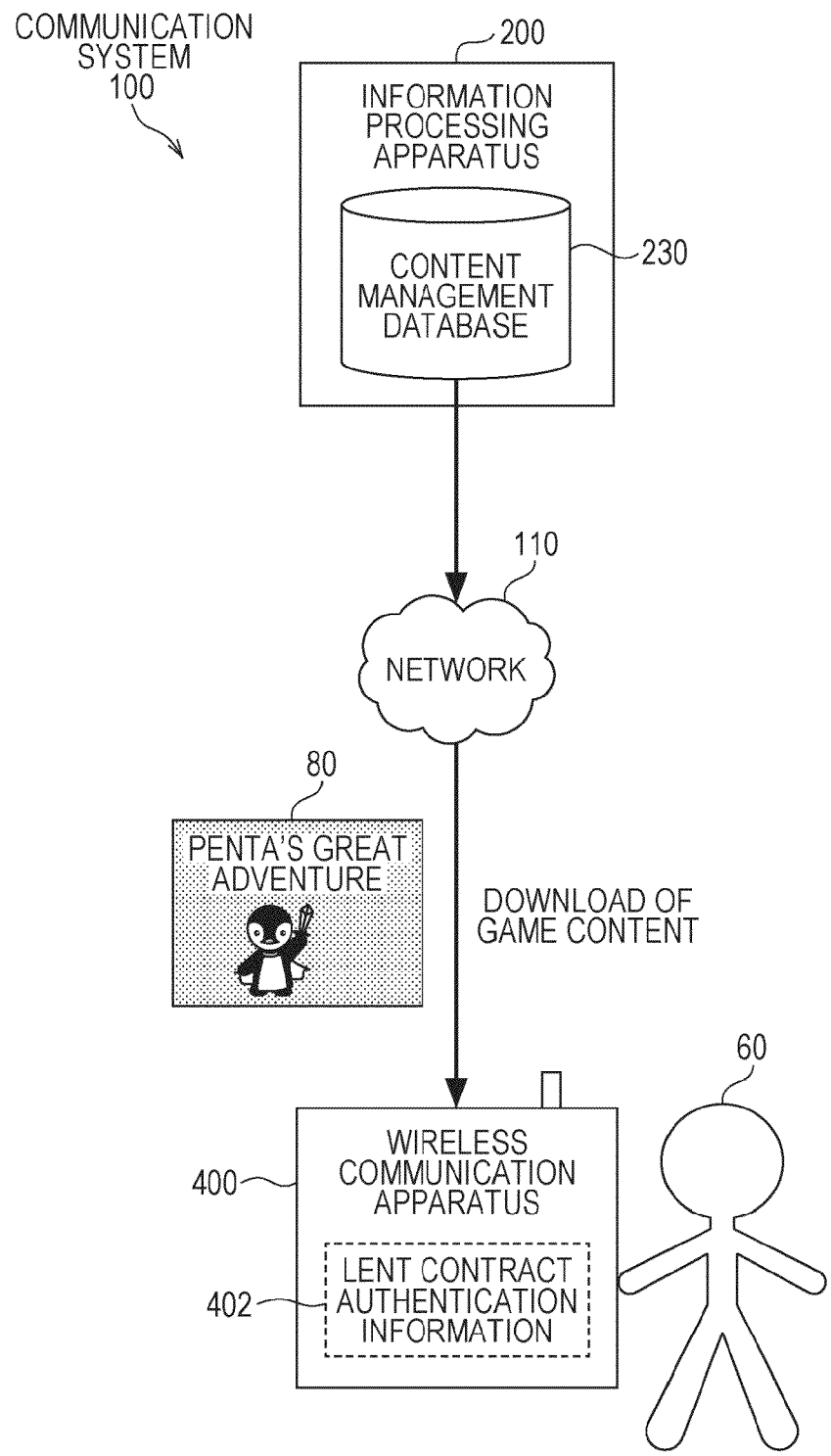
FIG. 19 is a diagram illustrating a simplified example of use of the wireless communication apparatus 400 according to a second embodiment of the present technology.

FIG. 19 is a diagram illustrating a simplified example of the use of the wireless communication apparatus 400 according to the second embodiment of the present technology. FIG. 19 illustrates a state where game content is downloaded using the wireless communication apparatus 400.

In FIG. 19, it is assumed that the wireless communication apparatus 400 is a game machine (for example, a portable game machine) that has the wireless communication function and that the software downloadable SIM can be used. Furthermore, it is assumed that the information processing apparatus 200 is a content server that can retain various items of content (game content, music content, and image content).

At this point, an example is described in which the game content is downloaded from the information processing apparatus 200 using the wireless communication apparatus 400 and thus is retained in the wireless communication apparatus 400. For example, it is assumed that with the operation unit 460 of the wireless communication apparatus 400, a user 60 performs each operation for downloading desired game content (for example, Penta's Great Adventure 80) from the information processing apparatus 200. An example of such an operation screen is described in detail referring to FIG. 20 and the like.

In this manner, if a predetermined operation is performed, the wireless communication apparatus 400 can download the desired game content (for example, Penta's Great Adventure 80) from the information processing apparatus 200 using the lent contract authentication information 402. For example, game content (for example, Penta's Great Adventure 80) that is recorded in the content management database 230 (illustrated in FIG. 3) is downloaded to the wireless communication apparatus 400 through the communication control apparatus (first communications carrier) 300 over the network 110. Then, the downloaded game content (for example, Penta's Great Adventure 80) is recorded in the memory 440.

[Example of Display Transition at a Time of Obtaining the Game Content]

FIG. 20 is a diagram illustrating an example of a display screen that is displayed on the display unit 470 of the wireless communication apparatus 400 according to the second embodiment of the present technology. Each of these display screens is displayed based on each piece of information that is transmitted from the information processing apparatus 200.

FIG. 20a illustrates a game summary screen 530 for performing an operation of selecting game content that is to be downloaded. The game summary screen 530, for example, is displayed in a state where the wireless communication apparatus 400 is connected to the website that is provided by the service provider 50.

Game icons 531 to 533, a return button 534, and a download execution button 535 are provided on the game summary screen 530. Moreover, for ease of description, illustrations and descriptions of other pieces of information that are displayed on the game summary screen 530 are omitted.

The game icons 531 to 533 are icons that indicate games that can be downloaded from the information processing apparatus 200. The user can select desired games by performing selection operations of selecting these icons.

The return button 534 is a button that is pushed down to return to the display screen that has been displayed just previously.

The download execution button 535 is a button that, after performing the selection operation of selecting any one from the game icons 531 to 533, is pushed down to start to download game content on which the selection operation is performed.

For example, the user of the wireless communication apparatus 400 displays the game summary screen 530 to the display unit 470, selects desired game content with an operational input from the operation unit 460, and performs a pushing-down operation on the download execution button 535. If the pushing-down operation is performed, the control unit 430 of the wireless communication apparatus 400 transmits game selection information (illustrated in FIG. 21) including information relating to the selected game to the information processing apparatus 200. Based on the game selection information, the information processing apparatus 200 lends the contract authentication information to the wireless communication apparatus 400. Furthermore, for example, FIG. 20*b* illustrates an example of display that results after the selection operation is performed on an icon for a desired game and the pushing-down operation is performed on the download execution button 535.

FIG. 20*b* illustrates an example of a display screen (game summary screen 540) that is displayed after on the game summary screen 530 illustrated in FIG. 20*a*, the selection operation is performed on the icon for the desired game and the pushing-down operation is performed on the download execution button 535.

Like the game summary screen 530 illustrated in FIG. 20*a*, the game summary screen 540 is a display screen for performing the operation of selecting the game content that is to be downloaded. For this reason, parts that are common to the game summary screen 530 and the game summary screen 540 are given like reference numerals, and some descriptions of these are omitted. However, it is assumed that at the time of the displaying of the game summary screen 540, the wireless communication apparatus 400 and the information processing apparatus 200 are connected based on the lent contract authentication information.

The game icons 531 to 533, the download execution button 535, a download ending button 541, and a region 542 for displaying the connection right on loan are provided on the game summary screen 540. Moreover, because the region 542 for displaying the connection right on loan is the same as the region 523 for displaying the connection right on loan that is illustrated in FIG. 12*a*, and the like, at this point, a description of the region 542 for displaying the connection right on loan is omitted.

The download ending button 541 is a button that is pushed down to end the use of the communication service (communication service using the lent connection right) that is performed between the wireless communication apparatus 400 and the information processing apparatus 200.

[Communication Example in a Case of Download of the Game Content]

Figure 21:
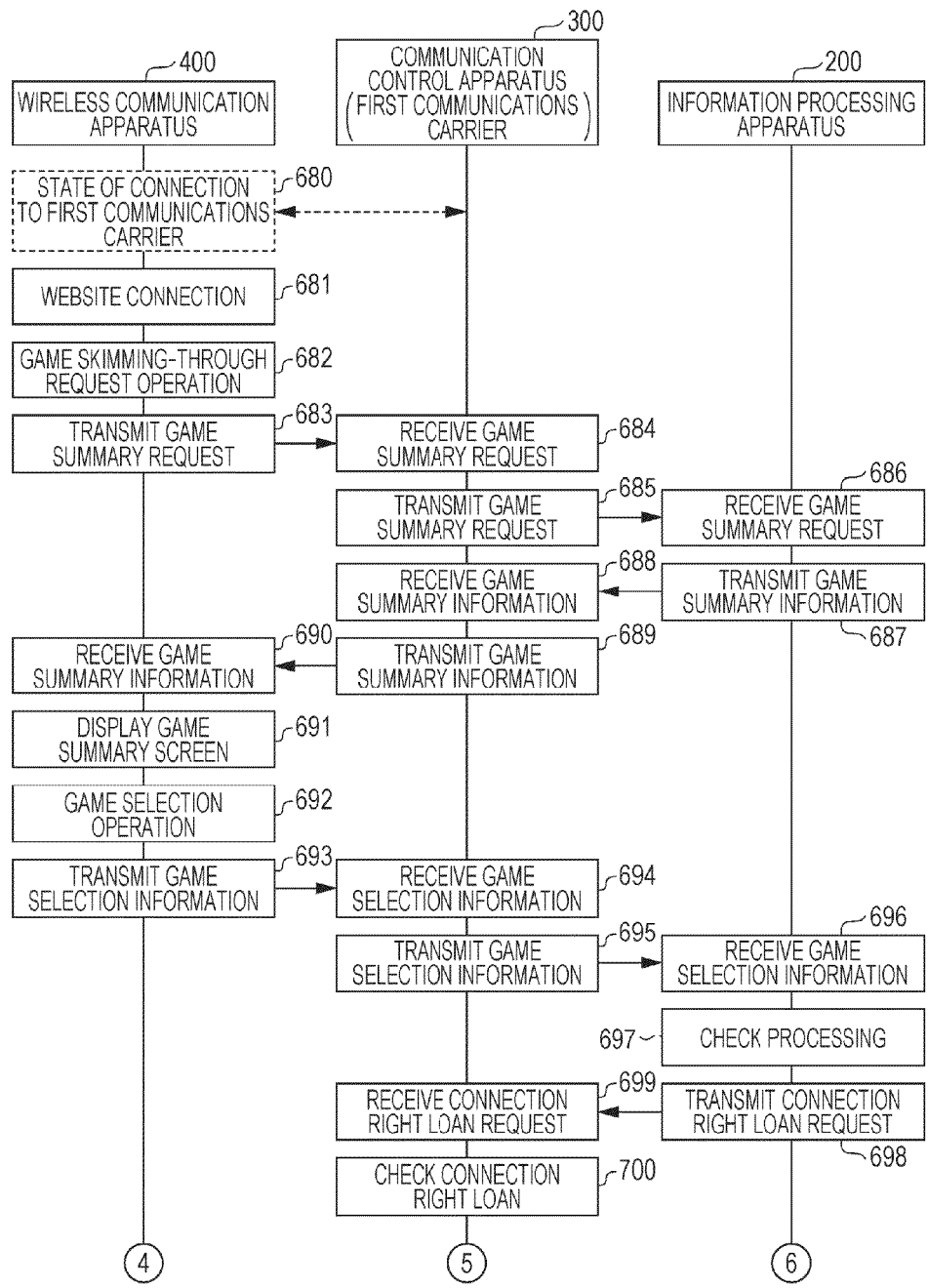
FIG. 21 is a sequence chart illustrating an example of communication processing between each apparatus that makes up the communication system 100 according to the second embodiment of the present technology.
Figure 22:
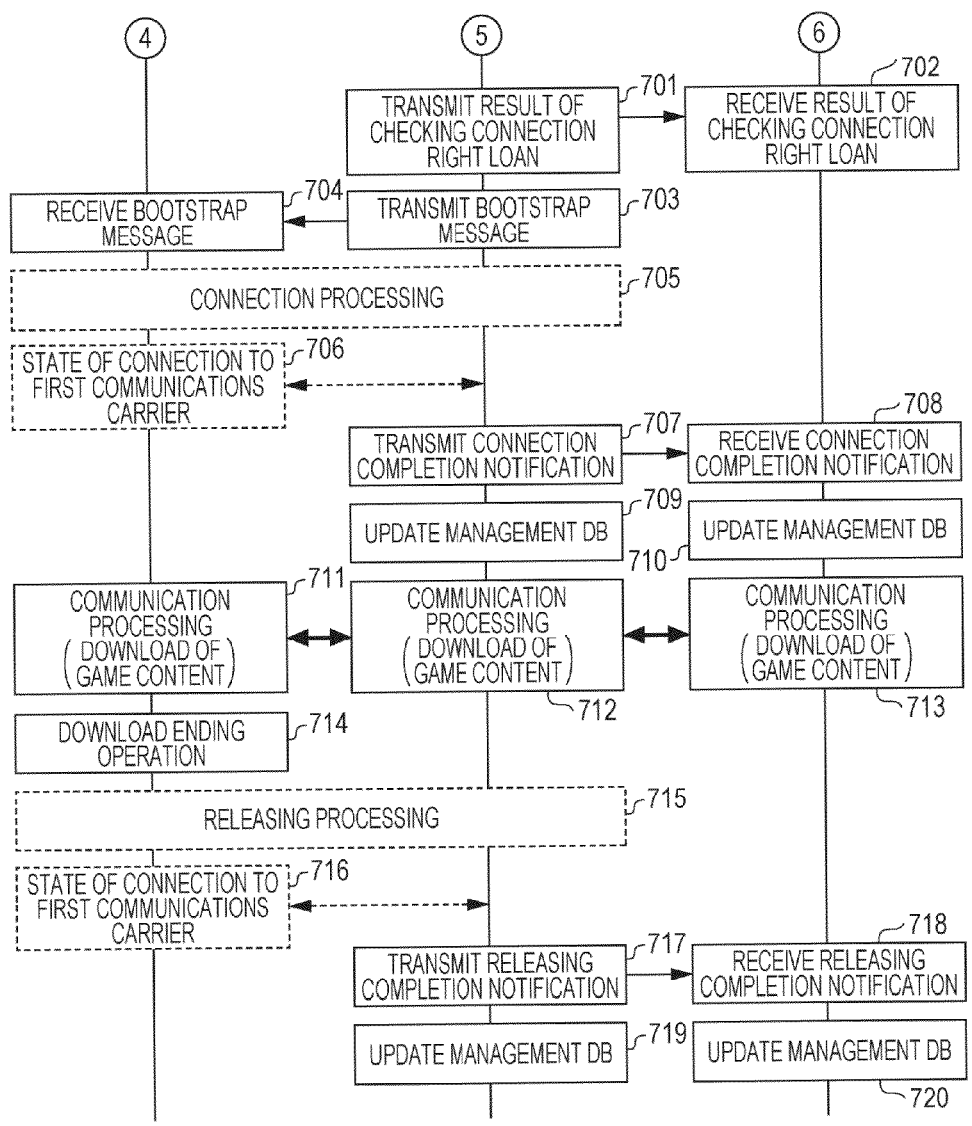
FIG. 22 is a sequence chart illustrating an example of the communication processing between each apparatus that makes up the communication system 100 according to the second embodiment of the present technology.

FIGS. 21 and 22 are sequence charts, each illustrating an example of the communication processing between each apparatus that makes up the communication system 100 according to the second embodiment of the present technology.

In this example, the wireless communication apparatus 400 is assumed to retain the contract authentication information (contract authentication information provided by the first communications carrier). Furthermore, the service provider 50 is assumed to lend the contract authentication information for performing the download to the user who performs the download of the game content. For this reason, if the download of the game content is performed, the wireless communication apparatus 400 can connect to the communication control apparatus (first communications carrier) 300 using the contract authentication information lent by the service provider 50 without using the contract authentication information that is retained in advance.

That is, the service provider 50 lends the contract authentication information only if the wireless communication apparatus that is used by the user who performs the download of the game content performs the download. Moreover, an initial state is assumed to be a connection state (680) in which the wireless communication apparatus 400 is connected to the communication control apparatus (first communications carrier) 300. Furthermore, it is assumed that the contract authentication information retained in advance in the wireless communication apparatus 400 is used for the communication until the contract authentication information is lent.

First, the user performs the operation for connecting to the website using the wireless communication apparatus 400, and the wireless communication apparatus 400 is connected to the website (website that is provided by the information processing apparatus 200) (681). Subsequently, the user of the wireless communication apparatus 400 performs a request operation for displaying in a summary manner a game that is to be downloaded (a game summary request operation) (682). If the game summary request operation is performed (682), a game summary request is transmitted to the information processing apparatus 200 (683 to 686). That is, the control unit 430 of the wireless communication apparatus 400 transmits the game summary request to the information processing apparatus 200 through the communication control apparatus (first communications carrier) 300 (683 to 686).

If the information processing apparatus 200 receives the game summary request (686), under the control of the control unit 260, the service provision unit 220 of the information processing apparatus 200 transmits game summary information to the wireless communication apparatus 400 (687 to 690). That is, the information (game summary information) for displaying in a summary manner the game being downloaded is transmitted to the wireless communication apparatus 400 through the communication control apparatus (first communications carrier) 300 (687 to 690).

If the wireless communication apparatus 400 receives the game summary information (690), based on the game summary information, the control unit 430 of the wireless communication apparatus 400 displays a game summary screen on the display unit 470 (691). For example, the game summary screen 530 illustrated in FIG. 20*a* is displayed (691).

Subsequently, the user performs the game selection operation on the game summary screen on the display unit 470 (692). For example, on the game summary screen 530 illustrated in FIG. 20a, the download execution button 535 is pushed down in a state where the game icon 533 is selected (692). In this manner, if the game selection operation is performed on the game summary screen (692), the control unit 430 of the wireless communication apparatus 400 transmits the game selection information according to the game selection operation to the information processing apparatus 200 (693 to 696). That is, the game selection information according to the game selection operation is transmitted from the wireless communication apparatus 400 to the information processing apparatus 200 through the communication control apparatus (first communications carrier) 300 (693 to 696). At this point, as the game selection information according to the game selection operation, for example, information for specifying the selected game (for example, a game ID), the terminal identification information, the type of terminal, and the information indicating the correspondence to the software downloadable SIM are transmitted.

If the information processing apparatus 200 receives the game selection information (696), the control unit 260 of the information processing apparatus 200 checks whether or not the wireless communication apparatus that transmits the game selection information corresponds to the software downloadable SIM (697). If the wireless communication apparatus does not correspond to the software downloadable SIM, the communication processing that performs the download of the game content, without lending the contract authentication information to the wireless communication apparatus, is performed.

Furthermore, if it is determined that the contract authentication information can be lent (697), the control unit 260 of the information processing apparatus 200 transmits the connection right loan request to the communication control apparatus (first communications carrier) 300 (698 and 699). Information (for example, the terminal identification information) for specifying the wireless communication apparatus that is the loan destination is included in the connection right loan request.

Moreover, each processing (698 to 708) subsequent to the transmission processing of the connection right loan request corresponds to each processing (617 and 627) illustrated in FIGS. 14 and 15. For this reason, a description of each processing (698 to 708) is omitted.

Furthermore, this example illustrates that the authentication processing is omitted, but for example, each processing (698 to 708) subsequent to the transmission processing of the connection right loan request may be performed after the authentication processing is performed on the user who enters into the contract with the service provider 50.

Furthermore, after the connection completion notification is transmitted (707), the control unit 320 of the communication control apparatus (first communications carrier) 300 records in each database the notification that the contract authentication information is lent to the wireless communication apparatus 400 and updates each of these databases (709). That is, the notification that the contract authentication information is lent to the wireless communication apparatus 400 is recorded in the device management database 330 and the contract authentication information management database 340, and the device management database 330 and the contract authentication information management database 340 are updated (709). In the device management database 330, for example, contents of the contract authentication information loan information 333 are changed from a state illustrated in FIG. 7a to a state illustrated in FIG. 7b (allocation to the terminal identification information 332 "CCCC"). Furthermore, in the contract authentication information management database 340, for example, the contents of the terminal identification information 342 are changed from a state illustrated in FIG. 8a to a state illustrated in FIG. 8b.

Furthermore, when the connection completion notification is received (708), the control unit 260 of the information processing apparatus 200 records in each database the notification that the contract authentication information is lent to the wireless communication apparatus 400, and updates each of these databases (710). That is, the notification that the contract authentication information is lent to the wireless communication apparatus 400 is recorded in the contract authentication information management database 250, and thus the contract authentication information management database 250 is updated (710). For example, the contents of the contract authentication information management database 250 are changed from the state illustrated in FIG. 5a to the state illustrated in FIG. 5b (loan to "CCCC").

Furthermore, when the connection processing is finished (705), the wireless communication apparatus 400 is brought into the connection state (706) based on the lent contract authentication information, between the wireless communication apparatus 400 and the communication control apparatus (first communications carrier) 300. For this reason, the wireless communication apparatus 400 connects to the information processing apparatus 200 through the communication control apparatus (first communications carrier) 300, and can perform the communication processing between the wireless communication apparatus 400 and the information processing apparatus 200 (711 to 713). That is, the wireless communication apparatus 400 is in a state where the communication service (download of the game content) can be used over the network (for example, the Internet) 110 (711 to 713). For example, the game summary screen 540 illustrated in FIG. 20b is displayed. Furthermore, on the game summary screen 540, if the download execution button 535 is pushed down in a state where any one is selected from the game icons 531 to 533, the download of the selected game content can be performed. In this manner, the user of the wireless communication apparatus 400 can perform the download of the game content in the communication-cost-free state, using the contract authentication information lent by the service provider 50.

If in this manner, the download of the game content is performed and then the download of the game content is ended (if the use of the service is ended), the user of the wireless communication apparatus 400 performs a download ending operation (714). For example, on the game summary screen 540 illustrated in FIG. 20b, the download ending button 541 is pushed down, and thus the download ending operation is performed (714).

If the download ending operation is performed (714), the control unit 430 of the wireless communication apparatus 400 performs the processing (releasing processing) for releasing the connection to the communication control apparatus (first communications carrier) 300 and invalidating the lent contract authentication information (715). In the releasing processing, the wireless communication apparatus 400 invalidates the lent contract authentication information and thus performs the processing for releasing the connection to the communication control apparatus (first communications carrier) 300.

Moreover, each processing (715 to 720) subsequent to the releasing processing corresponds to each processing (642 and 647) illustrated in FIG. 15. For this reason, a description of each processing (715 to 720) is omitted.

Moreover, it is assumed that before the user performs the download ending operation, the wireless communication apparatus 400 ends the current session abnormally or the communication channel is no longer available. In such a case, the control unit 260 of the information processing apparatus 200 detects that the session is ended, performs each processing (715) relating to the return of the connection right, and thus can invalidate the contract authentication information (lent contract authentication information).

Furthermore, this example illustrates that if the user performs the download ending operation, under the control of the control unit 430 of the wireless communication apparatus 400, the contract authentication information (lent contract authentication information) is invalidated in the wireless communication apparatus 400. However, if the user performs the download ending operation, under the control of the information processing apparatus 200, the contract authentication information (lent contract authentication information) may be invalidated. In this case, each processing corresponding to each processing (634 to 641) illustrated in FIG. 15 is performed after the download ending operation.

Furthermore, this example illustrates that the contract authentication information lent to the wireless communication apparatus 400 continues to be used until the user performs the download ending operation. However, if the limit on the time of use is imposed to the contract authentication information, and if a predetermined condition is satisfied, the lent contract authentication information may be invalidated. The predetermined condition, for example, is if the time (for example, the loan time 254 illustrated in FIG. 5) that elapses from when the contract authentication information is lent exceeds a limit value (for example, one hour), or is if the downloads of a predetermined number (for example, 3) of the items of content are not performed within a predetermined time (within one hour).

[Example of Operation of the Information Processing Apparatus]

Figure 23:
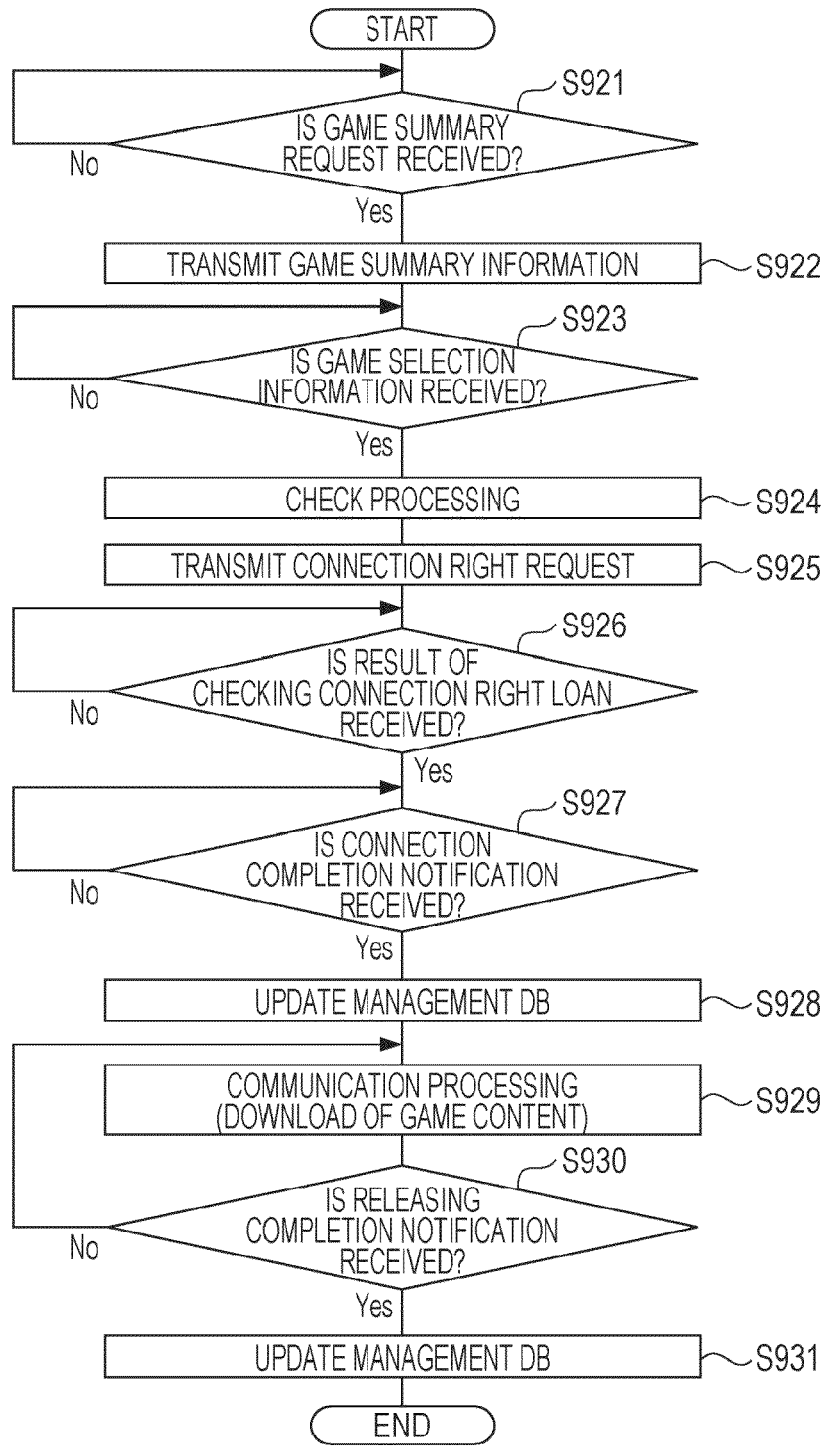
FIG. 23 is a flow chart illustrating one example of a processing process for the communication processing by the information processing apparatus 200 according to the second embodiment of the present technology.

FIG. 23 is a flow chart illustrating one example of a processing process for the communication processing by the information processing apparatus 200 according to the second embodiment of the present technology.

First, the control unit 260 determines whether or not the game summary request has been received (Step S921), and if the game summary request has not been received, continues to perform monitoring. On the one hand, if the game summary request has been received (Step S921), the service provision unit 220 transmits the game summary information to the wireless communication apparatus that transmits the game summary request (Step S922).

Subsequently, the control unit 260 determines whether or not the game selection information has been received (Step S923), and if the game selection information has not been received, continues to perform the monitoring. On the other hand, if the game selection information has been received (Step S923), the control unit 260 performs checking processing on the wireless communication apparatus that transmits the game selection information (Step S924). If with the checking processing, it is determined that the contract authentication information can be lent (Step S924), the control unit 260 transmits the connection right loan request to the communication control apparatus (first communications carrier) 300 (Step S925).

Subsequently, the control unit 260 determines whether or not the result (success) of checking the connection right loan to the effect that the contract authentication information can be lent has been received (Step S926), and if the result of checking the connection right loan to that effect has not been received, continues to perform the monitoring. On the one hand, if the result of checking the connection right loan to the effect that the contract authentication information can be lent has been received (Step S926), the control unit 260 determines whether or not the connection completion notification has been received (Step S927). If the connection completion notification has not been received, the control unit 260 continues to perform the monitoring. On the other hand, if the connection completion notification has been received (Step S927), the control unit 260 records in each database the notification that the contract authentication information is lent to the wireless communication apparatus, and updates each of these databases (Step S928).

Subsequently, the communication processing (communication processing based on the lent contract authentication information) is performed between the information processing apparatus 200 and the wireless communication apparatus through the communication control apparatus (first communications carrier) 300 (Step S929). Subsequently, the control unit 260 determines whether or not the releasing completion notification has been received (Step S930), and if the releasing completion notification is not received, returning to Step S929 takes place. On the other hand, if the releasing completion notification has been received (Step S930), the control unit 260 records in each database the notification that the lent contract authentication information is invalidated, and updates each of these database (Step S931).

[Example in which Different Communications Carriers Lend the Contract Authentication Information]

According to the first and second embodiments of the present technology, the example is described in which the original contract authentication information and the lent contract authentication information are managed by the same communications carrier (first communications carrier). However, the embodiments of the present technology can be applied also to a case where the original contract authentication information and the lent contract authentication information are managed by different communications carriers (for example, the first communications carrier and the second communications carrier).

For example, the contract authentication information (lent contract authentication information) is set to be in the wireless communication apparatus by using the communication based on the original contract authentication information. Furthermore, if the contract authentication information (lent contract authentication information) is lent, the original contract authentication information is re-set to be in the wireless communication apparatus (validation) by using the communication based on the lent contract authentication information.

3. Third Embodiment

According to the first and second embodiments of the present technology, the example is illustrated in which the information processing apparatus 200 manages the lent contract authentication information and the wireless communication apparatus (device) that is provided with the service. At this point, it is assumed that these types of management are performed by multiple apparatuses.

Then, according to the third embodiment of the present technology, the example is illustrated in which the lent contract authentication information and the wireless communication apparatus that is provided with the service are managed by the multiple apparatuses. Moreover, a configuration of the communication system according to the third embodiment of the present technology is substantially the same as the example illustrated in FIG. 2 and the like. For this reason, constituent elements that are common to the first and third embodiments according to the present technology are given like reference numerals, and some descriptions of these are omitted.

[Example of the Configuration of the Communication System]

Figure 24:
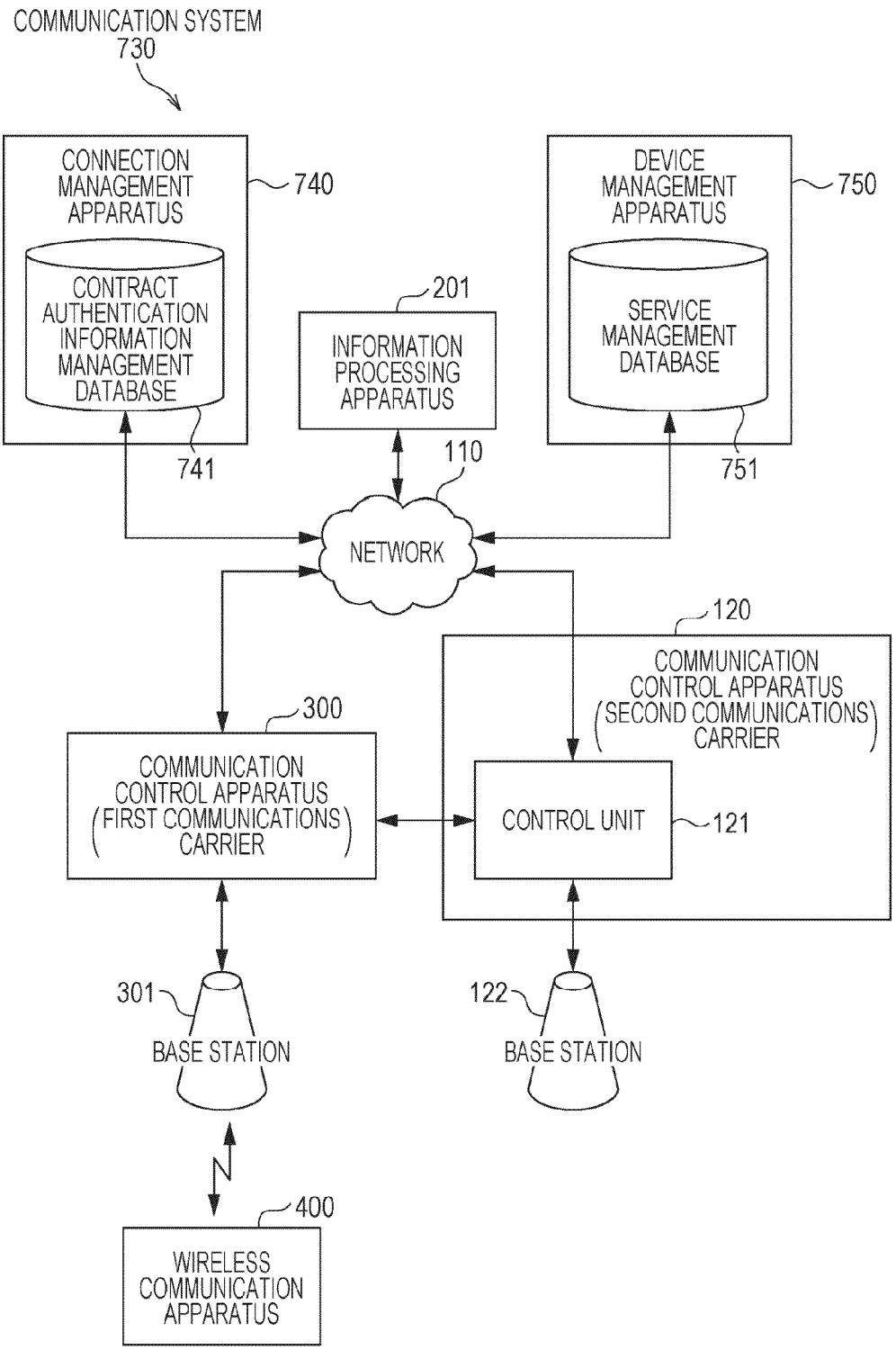
FIG. 24 is a block diagram illustrating a system configuration example of a communication system 730 according to a third embodiment of the present technology.

FIG. 24 is a block diagram illustrating an example of a system configuration of a communication system 730 according to the third embodiment of the present technology.

The communication system 730 includes an information processing apparatus 201, a connection management apparatus 740, and a device management apparatus 750.

The information processing apparatus 201 is an information processing apparatus (for example, a content server) that provides the various services over the network 110, and provides each wireless communication apparatus with the various communication service using the wireless communication. Moreover, the information processing apparatus 201 is a modification example of the information processing apparatus 200 illustrated in FIG. 3, and the service management database 240 and the contract authentication information management database 250 are omitted. Moreover, in addition to these being omitted, parts that are common to the information processing apparatus 200 and the information processing apparatus 201 are given like reference numerals, and some descriptions of these are omitted because the information processing apparatus 201 is the same as the information processing apparatus 200.

The connection management apparatus 740 is a connectivity manager that manages the contract authentication information that is lent to the wireless communication apparatus, and includes a contract authentication information management database 741. The use of the connection management apparatus 740 can centralize the management of the contract authentication information lent by the multiple service providers and can reduce the number of connections between the service provider and the communication control apparatus (communications carrier). Moreover, the connection management apparatus 740 is one example of a second management apparatus recited in the claims.

The contract authentication information management database 741 is equivalent to the contract authentication information management database 250 illustrated in FIG. 5. However, a difference lies in the fact that the contract authentication information lent by multiple communications carriers (for example, the first communications carrier and the second communications carrier) is managed.

The device management apparatus 750 is a device manager that manages the wireless communication apparatus to which the contract authentication information is lent, and includes a service management database 751. Furthermore, the device management apparatus 750 has a device authentication function or a profile function. Furthermore, the use of the device management apparatus 750 makes it possible to lend the contract authentication information only to the wireless communication apparatus (device) that is a specific type of device. Moreover, the device management apparatus 750 is one example of a first management apparatus recited in the claims.

The service management database 751 is equivalent to the service management database 240 illustrated in FIG. 4. However, a difference lies in the fact that the services provided by multiple service providers are managed.

[Example of the Communication in a Case of Download of the Game Content]

Figure 25:
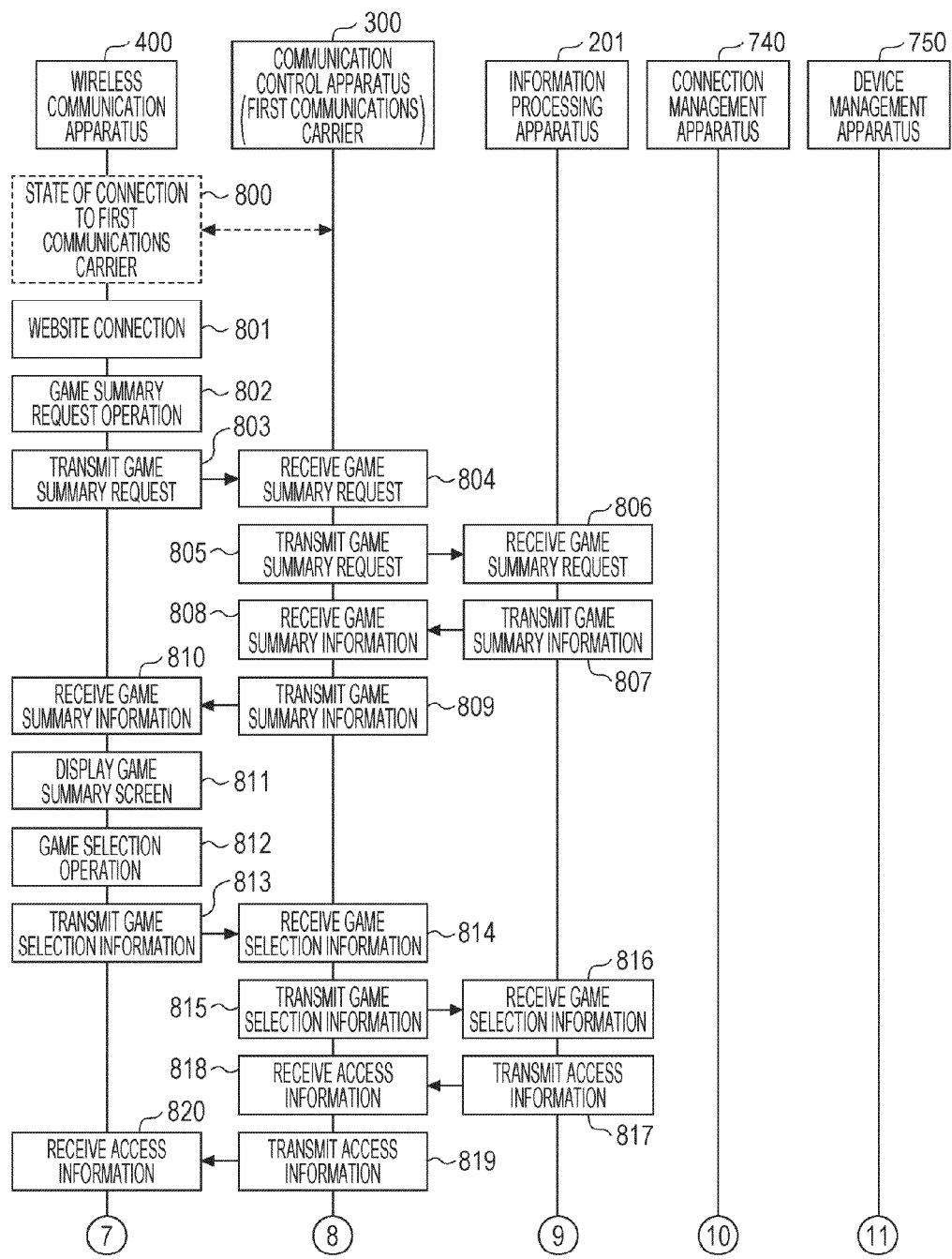
FIG. 25 is a sequence chart illustrating an example of communication processing between each apparatus that makes up the communication system 730 according to the third embodiment of the present technology.
Figure 26:
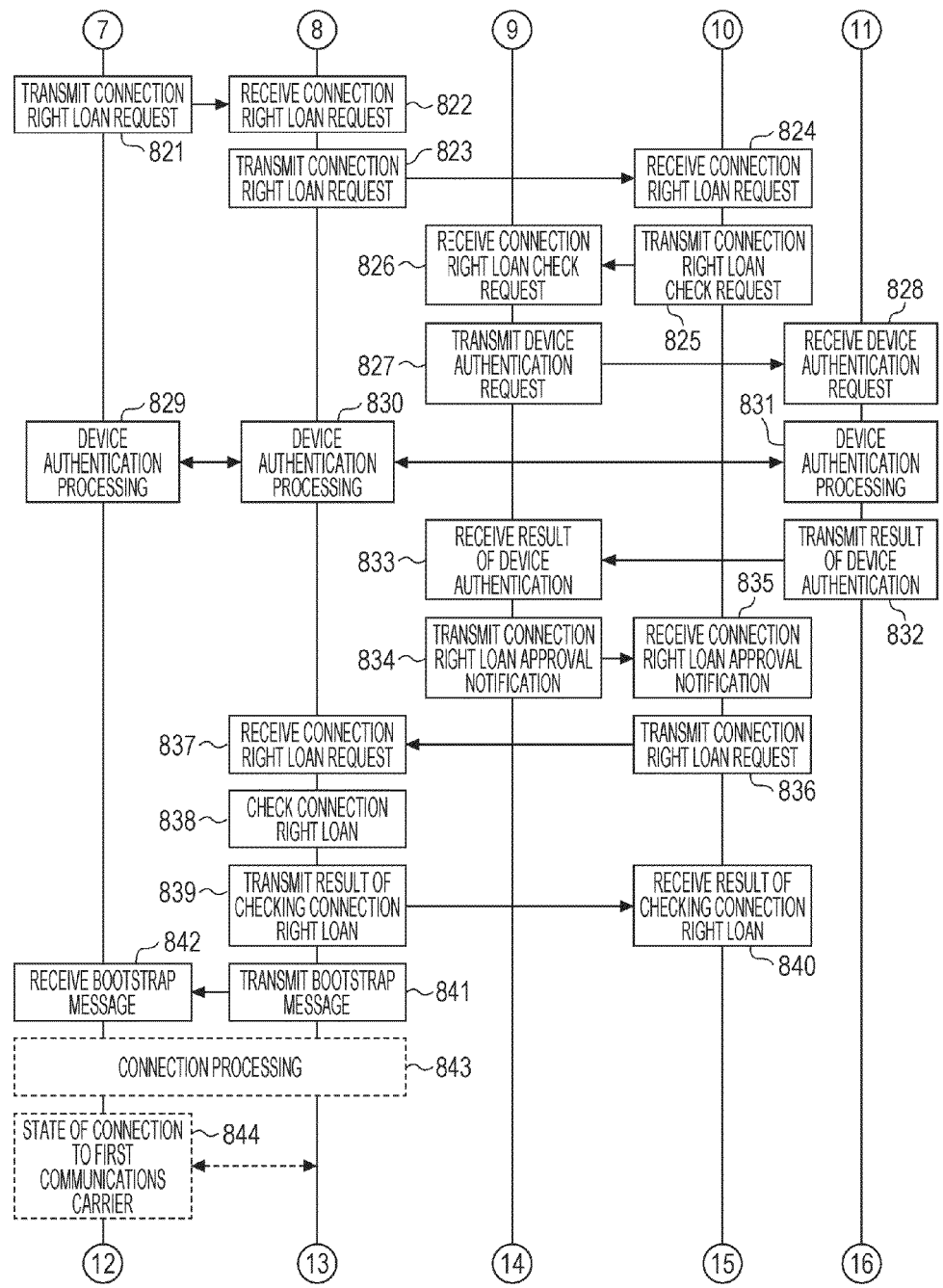
FIG. 26 is a sequence chart illustrating an example of the communication processing between each apparatus that makes up the communication system 730 according to the third embodiment of the present technology.
Figure 27:
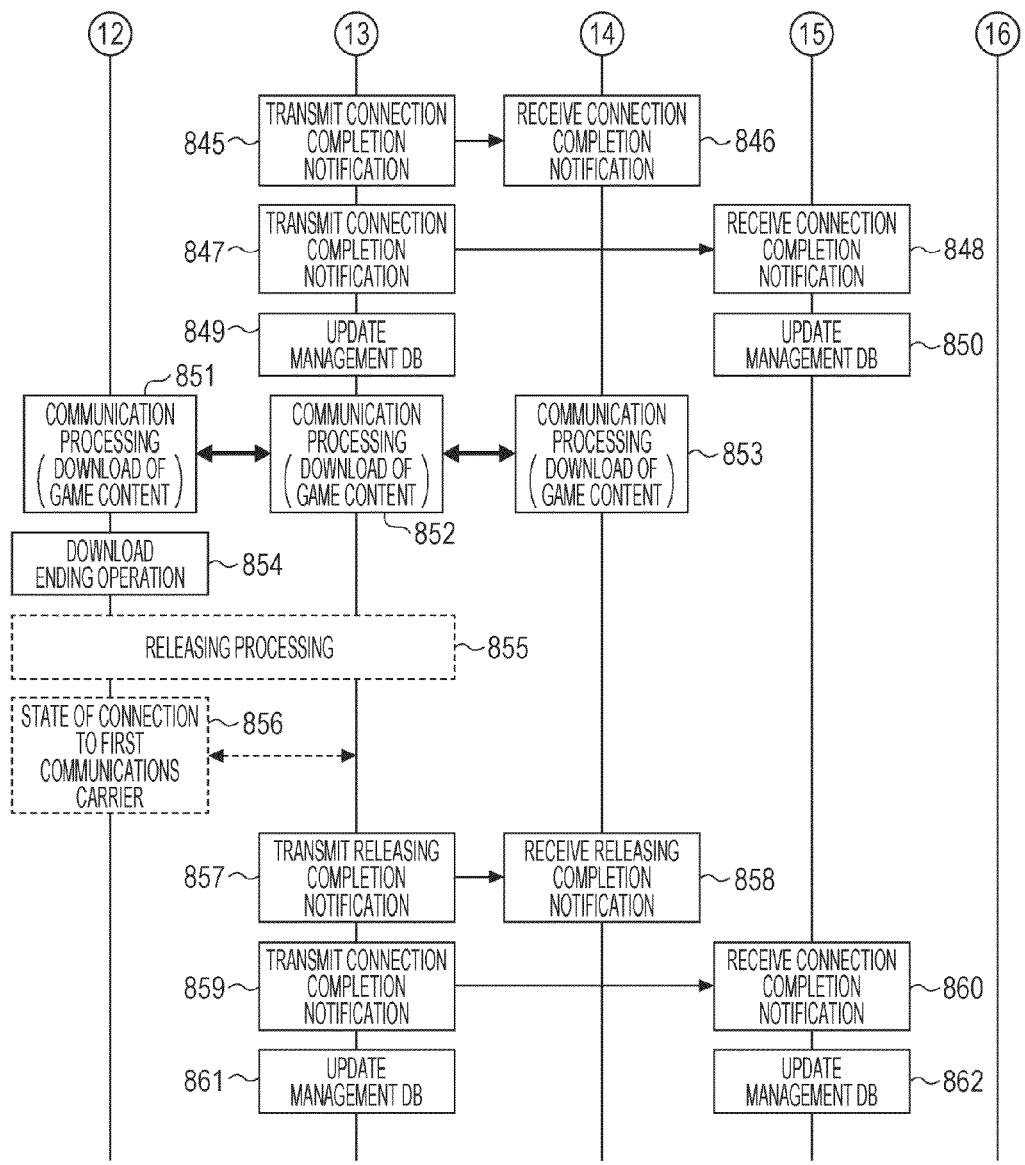
FIG. 27 is a sequence chart illustrating an example of the communication processing between each apparatus that makes up the communication system 730 according to the third embodiment of the present technology.

FIGS. 25 to 27 are sequence charts, each illustrating an example of the communication processing between each apparatus that makes up the communication system 730 according to the third embodiment of the present technology. This example illustrates that the download of the game content is performed as according to the second embodiment of the present technology.

Furthermore, in this example, it is assumed that the wireless communication apparatus 400 retains the contract authentication information (the contract authentication information provided by the first communications carrier). Furthermore, the service provider 50 is assumed to lend the contract authentication information for performing the download to the user who performs the download of the game content. For this reason, if the download of the game content is performed, the wireless communication apparatus 400 can connect to the communication control apparatus (first communications carrier) 300 using the contract authentication information lent by the service provider 50 without using the contract authentication information that is retained in advance.

That is, the service provider 50 lends the contract authentication information only if the wireless communication apparatus that is used by the user who performs the download of the game content downloads the content. Moreover, an initial state is assumed to be a connection state (800) in which the wireless communication apparatus 400 is connected to the communication control apparatus (first communications carrier) 300. Furthermore, it is assumed that the contract authentication information retained in advance in the wireless communication apparatus 400 is used for the communication until the contract authentication information is lent.

Moreover, each processing (801 to 816) in an initial stage corresponds to each processing (681 to 696) illustrated in FIG. 21. For this reason, a description of each processing (801 to 816) is omitted.

If the information processing apparatus 201 receives the game selection information (816), the control unit 260 of the information processing apparatus 201 transmits access information to the wireless communication apparatus 400 (817 to 820). The access information is information that includes the access information (for example, a URL of the information processing apparatus 201) for downloading the selected game, and the access information (for example, a URL of the connection management apparatus 740) for requesting for the loan of the contract authentication information.

If the wireless communication apparatus 400 receives the access information (820), the control unit 430 of the wireless communication apparatus 400 transmits the connection right loan request to the connection management apparatus 740, based on the access information (821 to 824). The information (for example, the terminal identification information) for specifying the wireless communication apparatus 400 that is the loan destination is included in the connection right loan request.

If the connection management apparatus 740 receives the connection right loan request (824), the control unit of the connection management apparatus 740 transmits a connection right loan check request to the information processing apparatus 201 (825 and 826). The connection right loan check request is a request necessary to check whether or not the contract authentication information that is managed by the contract authentication information management database 741 may be lent to the wireless communication apparatus 400. Furthermore, the information (for example, the terminal identification information) for specifying the wireless communication apparatus 400 that is the loan destination is included in the connection right loan check request.

If the information processing apparatus 201 receives the connection right loan check request (826), the control unit 260 of the information processing apparatus 201 transmits a device authentication request to the device management apparatus 750 (827 and 828). The device authentication request is a request necessary to perform authentication of whether or not the wireless communication apparatus 400 is a target device that has to use a service, and includes the information (for example, the terminal identification information) for specifying the wireless communication apparatus 400 that is the loan destination.

If the device management apparatus 750 receives the device authentication request (828), device authentication processing is performed between the wireless communication apparatus 400 and the device management apparatus 750 (829 to 831). The device authentication processing is performed through the communication control apparatus (first communications carrier) 300. Furthermore, in the device authentication processing, the authentication is performed by checking whether or not the wireless communication apparatus 400 that is the loan destination is the target device that has to use the service, based on each of the contents of the service management database 751. Moreover, the wireless communication apparatus 400 that is the loan destination may perform the authentication by checking whether or not the wireless communication apparatus 400 that is the loan destination is a target type of device that has to use the service.

If the device authentication processing is finished (829 to 831), the control unit of the device management apparatus 750 transmits the result (result of the device authentication) to the information processing apparatus 201 (832 and 833). If the result of the device authentication is success, the control unit 260 of the information processing apparatus 201 transmits a connection right loan approval notification to the connection management apparatus 740 (834 and 835). The connection right loan approval notification is information for notifying an approval to lend the contract authentication information owned by the information processing apparatus 201 (service provider 50). On the other hand, if the device authentication result is failure, for example, the control unit 260 of the information processing apparatus 201 transmits an error notification to the wireless communication apparatus 400 and displays the error notification. In this manner, if the device authentication result is a failure, processing relating to the loan of the contract authentication information is ended.

If the connection management apparatus 740 receives the connection right loan approval notification (835), the control unit of the connection management apparatus 740 transmits the connection right loan request to the communication control apparatus (first communications carrier) 300 (836 and 837). The information (for example, the terminal identification information) for specifying the wireless communication apparatus that is the loan destination is included in the connection right loan request.

Moreover, each processing (836 to 862) subsequent to the transmission processing of the connection right loan request corresponds to each processing (698 to 720) illustrated in FIGS. 21 and 22. However, a difference lies in the fact that the information transmitted from the information processing apparatus 200 is used at the time of the communication processing (851 to 853). Furthermore, the management of each database is performed in the connection management apparatus 740 side, not in the information processing apparatus 201 side (850 and 862).

In this manner, the connection management apparatus 740 is an apparatus that manages the connection right that is lent at the time of the provision of a specific service. Furthermore, the connection management apparatus 740 determines whether or not the connection right can be lent to each of the wireless communication apparatuses. Then, the control unit 260 performs control for lending the connection right, only on the wireless communication apparatus that is determined, by the connection management apparatus 740, as an apparatus to which the connection right can be lent.

Furthermore, the device management apparatus 750 is an apparatus that manages the wireless communication apparatus that can be provided with a specific service. Furthermore, the device management apparatus 750 determines whether or not each of the wireless communication apparatuses can be provided with a specific service. Then, the control unit 260 performs the control for lending the connection right only to the wireless communication apparatus that is determined, by the device management apparatus 750, as being able to be provided with a specific service.

In this manner, the addition of the connectivity manager function to the communication system 730 makes it possible to centralize a function of or an operation of managing the contract authentication information owned by multiple service providers (service provision companies). Accordingly, a cost of establishing the service provider or the number of connections between the network (communications carrier) and the service provider can be at least suppressed. Furthermore, the contract authentication information can be shared among the multiple service providers.

Furthermore, the addition of the device manager function to the communication system 730 makes it possible to centralize a function of managing a device type or a device feature and to reduce the cost of establishing the service provider.

Moreover, according to the third embodiment of the present technology, the example is illustrated in which the apparatus (connection management apparatus 740) that has the connectivity manager function is different from the apparatus (device management apparatus 750) that has the device manager function. However, an integrally-configured apparatus (information processing apparatus) may have the connectivity manager function and the device manager function. Thus, the integrally-configured apparatus may perform each processing that is performed by the connection management apparatus 740 and the device management apparatus 750.

In this manner, according to the embodiment of the present technology, a communication resource (contract authentication information) owned by a network service operator (communications carrier) is made to be cooperatively linked to the service that is provided by the service provider (for example, a website administrator), and thus can be lent to the device that is used by the user. That is, the loan of the communication resource that is made to be cooperatively linked to the network service can be properly performed. In this case, the contract authentication information that is retained by the service provider can be lent only to the user who uses such a service. Accordingly, the service provider can bear communication expenses that are incurred when using a specific service, and a new business model can be provided. That is, in this manner, the proper communication service according to the use by the user can be provided.

Furthermore, the service provider can lend the contract authentication information at the timing according to a service form. For example, the selection or loan of the contract authentication information being lent can be limited or prohibited according to a device type or a device feature (an owner or the presence or absence of a detailed function). For example, unintended loan of the contract authentication information to the maliciously-modified device by the service provider can be prevented. Furthermore, the service provider can provide a normal service also to a device that does not use the contract authentication information.

Moreover, according to the embodiment of the present technology, the example is illustrated in which based on the request from the wireless communication apparatus, the contract authentication information is lent, but for example, the contract authentication information may be lent based on the control from the service provider side. For example, if electronic book content that is a periodical publication is downloaded to the wireless communication apparatus, the contract authentication information is lent to the wireless communication apparatus at the time of the publishing of the periodical publication, and thus the download can be automatically performed.

Moreover, according to the embodiment of the present technology, the description is provided with the integrally-configured information processing apparatus (communication control apparatuses 120 and 300, the information processing apparatuses 200 and 201, and the like) as an example. However, the embodiments of the present technology can be applied also to the information processing system in which each unit (for example, the control unit 260) that is included by each of these information processing apparatuses is configured from the multiple apparatuses.

Furthermore, the embodiments of the present technology can be applied to a portable wireless communication apparatus (for example, a data communication-dedicated terminal apparatus) or a stationary wireless communication apparatus. For example, the embodiments of the present technology can be applied to a wireless communication apparatus a purpose of which is to collect data in a vending machine and to a wireless communication apparatus that is built into an elevator, a vehicle, and an electronic apparatus (for example, a household electric appliance, a game machine, and a digital photograph frame).

Furthermore, the embodiments of the present technology can be applied also to the connection right to connect to a predetermined network using other pieces of information (for example, a universal subscriber identity module (USIM)) as the contract authentication information.

Moreover, the embodiments described above are examples for realizing the present technology, and matters according to the embodiments have a one-to-one correspondence relationship with invention-specific matters in the claims, respectively. In the same manner, the invention-specific matters in claims have a one-to-one correspondence relationship with the matters according to the embodiments of the present technology, to which the same names as those of the invention-specific matters are assigned, respectively. However, the present technology is not limited to the embodiments, and may be realized by making various modifications to the embodiments within a range that does not deviate from the gist of the present technology.

Furthermore, the processing processes described according to the embodiments may be regarded as a method that has a sequence of the processes, may be a program for causing a computer to execute the sequence of the processes, or may be a recording medium on which the program is stored. As the recording medium, for example, a Compact Disc (CD), a MiniDisc (MD), a Digital Versatile Disk (DVD), a memory card, a Blu-ray Disc (registered trademark) and the like can be used.

Moreover, the present technology can be configured as follows.

(1) An information processing apparatus including: a control unit that performs control for lending to a wireless communication apparatus a connection right that is used in providing a specific service, the connection right being for connecting to a predetermined network using wireless communication; and a provision unit that, using the wireless communication, provides the specific service to the wireless communication apparatus that is connected using the lent connection right.

(2) The information processing apparatus according to (1), in which the control unit validates the connection right that is lent to the wireless communication apparatus at the timing of starting to supply the specific service and performs control for invalidating the connection right at the timing of ending providing the specific service.

(3) The information processing apparatus according to (1), in which the control unit lends to the wireless communication apparatus the connection right to which a limit on a time of use is imposed, and, if a predetermined time relating to the limit on the time of use elapses from when the connection right is lent, the control unit performs control for invalidating the connection right.

(4) The information processing apparatus according to any one of (1) to (3), in which the control unit performs control for lending to the wireless communication apparatus the connection right that is used only in providing the specific service.

(5) The information processing apparatus according to any one of (1) to (4), in which if a request to provide the specific service is received, the control unit performs control for lending the connection right to the wireless communication apparatus that transmits the provision request.

(6) The information processing apparatus according to (5), further including a first management unit that manages the wireless communication apparatus that is able to be provided with the specific service, in which the control unit determines whether or not the wireless communication apparatus that transmits the request to provide the specific service is able to be provided with the specific service, based on contents of management in the first management unit, and performs control for lending the connection right only to the wireless communication apparatus that is determined as being able to be provided with the specific service.

(7) The information processing apparatus according to (6), in which management information including at least one among identification information, a password, and model information for specifying the wireless communication apparatus that is able to be provided with the specific service is stored in the first management unit, and the control unit determines whether or not the wireless communication apparatus that transmits the provision request is able to be provided with the specific service, based on whether or not there is consistency between information, included in the provision, and the management information.

(8) The information processing apparatus according to (5), further including a second management unit that manages the connection right that is lent, at the time of providing the specific service, in which the control unit determines whether or not the connection right is able to be lent to the wireless communication apparatus that transmits the supply request, based on contents of management in the second management unit, and performs control for lending the connection right only to the wireless communication apparatus that is determined as an apparatus to which the connection right is able to be lent.

(9) The information processing apparatus according to (8), in which an upper limit value of the wireless communication apparatus to which the connection right can be lent is stored in the second management unit; and if the number of the wireless communication apparatuses to which the connection right is lent does not exceed the upper limit value at the time of receiving the supply request, the control unit determines that the connection right is able to be lent to the wireless communication apparatus.

(10) A communication system including: an information processing apparatus that includes a control unit which performs control for lending to a wireless communication apparatus a connection right that is used in providing a specific service, the connection right being for connecting to a predetermined network using wireless communication; and a wireless communication apparatus that is provided with the specific service using wireless communication by connecting to the information processing apparatus using the lent connection right.

(11) The communication system according to (10), further including a first management apparatus that manages the wireless communication apparatus that is able to be provided with the specific service, in which the first management apparatus determines whether or not each of the wireless communication apparatuses is able to be provided with the specific service, and the control unit performs control for lending the connection right only to the wireless communication apparatus that is determined, by the first management apparatus, as being able to be provided with the specific service.

(12) The communication system according to (10) or (11), further including a second management apparatus that manages the connection right that is lent, at the time of providing the specific service, in which the second management apparatus determines whether or not the connection right is able to be lent to each of the wireless communication apparatuses, and the control unit performs control for lending the connection right only to the wireless communication apparatus that is determined, by the second management apparatus, as an apparatus to which the connection right is able to be lent.

(13) An information processing method including: a control process of performing control for lending to a wireless communication apparatus a connection right that is used in providing a specific service, the connection right being for connecting to a predetermined network using wireless communication; and a communication process of providing the wireless communication apparatus that is connected using the lent connection right, with the specific service using the wireless communication.

REFERENCE SIGNS LIST 10, 100, 730 COMMUNICATION SYSTEM
20, 30 COMMUNICATION CONTROL APPARATUS
21, 31, 122, 301 BASE STATION
40, 110 NETWORK
50 SERVICE PROVIDER
120 COMMUNICATION CONTROL APPARATUS (SECOND COMMUNICATIONS CARRIER)
121 CONTROL UNIT
200, 201 INFORMATION PROCESSING APPARATUS
210 COMMUNICATION UNIT
220 SERVICE PROVISION UNIT
230 CONTENT MANAGEMENT DATABASE
240 SERVICE MANAGEMENT DATABASE
250 CONTRACT AUTHENTICATION INFORMATION MANAGEMENT DATABASE
260 CONTROL UNIT
300 COMMUNICATION CONTROL APPARATUS (FIRST COMMUNICATIONS CARRIER)
310 COMMUNICATION UNIT
320 CONTROL UNIT
330 DEVICE MANAGEMENT DATABASE
340 CONTRACT AUTHENTICATION INFORMATION MANAGEMENT DATABASE
400 WIRELESS COMMUNICATION APPARATUS
411 ANTENNA
412 ANTENNA SHARING UNIT
421 MODULATION UNIT
422 DEMODULATION UNIT
430 CONTROL UNIT
431 BUS
440 MEMORY
450 CONTRACT AUTHENTICATION INFORMATION STORAGE UNIT
460 OPERATION UNIT
470 DISPLAY UNIT
480 POSITIONAL INFORMATION OBTAINMENT UNIT
491 MICROPHONE
492 SPEAKER
740 CONNECTION MANAGEMENT APPARATUS
741 CONTRACT AUTHENTICATION INFORMATION MANAGEMENT DATABASE
750 DEVICE MANAGEMENT APPARATUS
751 SERVICE MANAGEMENT DATABASE

The invention claimed is:

1. An information processing apparatus comprising:
a control unit that:
performs control for lending to a wireless communication apparatus a connection right that is used in providing a specific service, the connection right being for connecting to a predetermined network using wireless communication, and
determines whether or not the connection right is able to be lent to the wireless communication apparatus that transmits a provision request, based on contents of management in a first management unit,
wherein the connection right is lent to the wireless communication apparatus that is determined as an apparatus to which the connection right is able to be lent; and
a provision unit that, using the wireless communication, provides the specific service to the wireless communication apparatus that is connected using the lent connection right.

2. The information processing apparatus according to claim 1,
wherein the control unit validates the connection right that is lent to the wireless communication apparatus at the timing of starting to provide the specific service and performs control for invalidating the connection right at the timing of ending providing the specific service.

3. The information processing apparatus according to claim 1,
wherein the control unit lends to the wireless communication apparatus the connection right to which a limit on a time of use is imposed, and
wherein if a predetermined time relating to the limit on the time of use elapses from when the connection right is lent, the control unit performs control for invalidating the connection right.

4. The information processing apparatus according to claim 1,
wherein the control unit performs control for lending to the wireless communication apparatus the connection right that is used only in providing the specific service.

5. The information processing apparatus according to claim 1, wherein if the provision request to provide the specific service is received, the control unit performs the control for lending the connection right to the wireless communication apparatus that transmits the provision request.

6. The information processing apparatus according to claim 5,
   wherein the first management unit manages the connection right that is lent, at a time of providing the specific service.

7. The information processing apparatus according to claim 6,
   wherein an upper limit value of the wireless communication apparatus to which the connection right can be lent is stored in the first management unit; and
   wherein if the number of the wireless communication apparatuses to which the connection right is lent does not exceed the upper limit value at a time of receiving the provision request, the control unit determines that the connection right is able to be lent to the wireless communication apparatus.

8. An information processing apparatus comprising:
   a control unit that performs control for lending to a wireless communication apparatus a connection right that is used in providing a specific service, the connection right being for connecting to a predetermined network using wireless communication,
   wherein if a request to provide the specific service is received, the control unit performs the control for lending the connection right to the wireless communication apparatus that transmits the provision request;
   a provision unit that, using the wireless communication, provides the specific service to the wireless communication apparatus that is connected using the lent connection right; and
   a first management unit that manages the wireless communication apparatus that is able to be provided with the specific service,
   wherein the control unit determines whether or not the wireless communication apparatus that transmits the provision request is able to be provided with the specific service, based on contents of management in the first management unit, and performs the control for lending the connection right only to the wireless communication apparatus that is determined as being able to be provided with the specific service.

9. The information processing apparatus according to claim 8,
   wherein management information including at least one among identification information, a password, and model information for specifying the wireless communication apparatus that is able to be provided with the specific service is stored in the first management unit, and
   wherein the control unit determines whether or not the wireless communication apparatus that transmits the provision request is able to be provided with the specific service, based on whether or not there is consistency between information, included in the provision request, and the management information.

10. A communication system comprising:
    an information processing apparatus that includes a control unit which performs control for lending to a wireless communication apparatus a connection right that is used in providing a specific service, the connection right being for connecting to a predetermined network using wireless communication;
    a wireless communication apparatus that is provided with the specific service using the wireless communication by connecting to the information processing apparatus using the lent connection right; and
    a first management apparatus that manages the connection right that is lent, at a time of providing the specific service,
    wherein the first management apparatus determines whether or not the connection right is able to be lent to each of the wireless communication apparatuses, and
    wherein the control unit performs the control for lending the connection right only to the wireless communication apparatus that is determined, by the first management apparatus, as an apparatus to which the connection right is able to be lent.

11. The communication system according to claim 10, further comprising:
    a second management apparatus that manages the wireless communication apparatus that is able to be provided with the specific service,
    wherein the second management apparatus determines whether or not each of the wireless communication apparatuses is able to be provided with the specific service, and
    wherein the control unit performs the control for lending the connection right only to the wireless communication apparatus that is determined, by the second management apparatus, as being able to be provided with the specific service.

12. An information processing method comprising:
    performing control for lending to a wireless communication apparatus a connection right that is used in providing a specific service, the connection right being for connecting to a predetermined network using wireless communication;
    determining whether or not the connection right is able to be lent to the wireless communication apparatus that transmits a provision request, based on contents of management in a management unit,
    wherein the connection right is lent to the wireless communication apparatus that is determined as an apparatus to which the connection right is able to be lent; and
    providing the wireless communication apparatus that is connected using the lent connection right, with the specific service using the wireless communication.

* * * * *